(12) United States Patent
Roberts

(10) Patent No.: US 7,158,122 B2
(45) Date of Patent: Jan. 2, 2007

(54) CALIBRATION OF FORCE BASED TOUCH PANEL SYSTEMS

(75) Inventor: Jerry B. Roberts, Arlington, MA (US)

(73) Assignee: 3M Innovative Properties Company, St. Paul, MN (US)

(*) Notice: Subject to any disclaimer, the term of this patent is extended or adjusted under 35 U.S.C. 154(b) by 875 days.

(21) Appl. No.: 10/147,604

(22) Filed: May 17, 2002

(65) Prior Publication Data

US 2003/0214485 A1    Nov. 20, 2003

(51) Int. Cl.
*G09G 5/00*    (2006.01)
*G06K 11/06*   (2006.01)

(52) U.S. Cl. .................................... 345/173; 178/18.02
(58) Field of Classification Search ........ 345/173–179; 178/18.01–18.11, 19.01–19.06
See application file for complete search history.

(56) References Cited

U.S. PATENT DOCUMENTS

| | | | |
|---|---|---|---|
| 3,657,475 A | 4/1972 | Peronneau et al. | |
| 4,089,036 A | 5/1978 | Geronime | |
| 4,121,049 A | 10/1978 | Roeber | |
| 4,340,777 A | 7/1982 | DeCosta et al. | |
| 4,355,202 A | 10/1982 | DeCosta et al. | |
| 4,389,711 A | 6/1983 | Hotta et al. | |
| 4,484,179 A | 11/1984 | Kasday | |
| 4,495,434 A | 1/1985 | Diepers et al. | |
| 4,511,760 A | 4/1985 | Garwin et al. | |
| 4,542,375 A | 9/1985 | Alles et al. | |
| 4,550,384 A | 10/1985 | Kimura | |
| 4,558,757 A | 12/1985 | Mori et al. | |
| 4,675,569 A | 6/1987 | Bowman et al. | |
| 4,697,049 A | 9/1987 | Peemoller et al. | |
| 4,745,565 A | 5/1988 | Garwin et al. | |
| 4,771,277 A | 9/1988 | Barbee et al. | |
| 4,775,765 A | 10/1988 | Kimura et al. | |
| 4,816,811 A | 3/1989 | Bogatin et al. | |
| 4,875,378 A | 10/1989 | Yamazaki et al. | |
| 4,893,115 A | 1/1990 | Blanchard | |
| 4,918,262 A | 4/1990 | Flowers et al. | |
| 4,983,787 A | 1/1991 | Kunikane | |
| 5,038,142 A | 8/1991 | Flower et al. | |
| 5,060,066 A | 10/1991 | Roberts | |
| 5,072,076 A | 12/1991 | Camp, Jr. | |
| 5,157,227 A | 10/1992 | McDermott et al. | |
| 5,241,308 A | 8/1993 | Young | |

(Continued)

FOREIGN PATENT DOCUMENTS

EP    0 531 815    3/1993

(Continued)

OTHER PUBLICATIONS

"Force Concentrator For Touch Sensitive Panel Using Snap-Action Switches", IBM Technical Disclosure Bulleting #NN7606238, vol. 19, Jun. 1976.

(Continued)

*Primary Examiner*—Alexander Eisen
(74) *Attorney, Agent, or Firm*—Robert J. Pechman

(57) ABSTRACT

A method and system are provided to correct inaccuracies in touch location determination associated with mechanical distortion of the touch screen. Calibration parameters are provided for a touch screen characterizing an error in an expected touch signal associated with mechanical distortion of the touch screen. A force responsive touch signal having the error is detected and the touch location determined using the calibration parameters to correct the error in the touch signal. The calibration parameters are determined by applying mechanical distortion to the touch screen and characterizing the touch signal error associated with the mechanical distortion. The calibration parameters are produced using the characterization of the touch signal error

49 Claims, 13 Drawing Sheets

U.S. PATENT DOCUMENTS

| | | |
|---|---|---|
| 5,376,948 A | 12/1994 | Roberts |
| 5,541,372 A | 7/1996 | Baller et al. |
| 5,543,588 A | 8/1996 | Bisset et al. |
| 5,543,591 A | 8/1996 | Gillespie et al. |
| 5,563,632 A | 10/1996 | Roberts |
| 5,708,460 A | 1/1998 | Young et al. |
| 5,714,694 A | 2/1998 | Diessner |
| 5,854,625 A | 12/1998 | Frisch et al. |
| 5,940,065 A * | 8/1999 | Babb et al. .................. 345/178 |
| 5,943,043 A | 8/1999 | Furuhata et al. |
| 6,108,211 A | 8/2000 | Diessner |
| 6,285,358 B1 | 9/2001 | Roberts |
| 6,642,458 B1 * | 11/2003 | Panagrossi III et al. . 178/18.01 |

FOREIGN PATENT DOCUMENTS

| | | |
|---|---|---|
| JP | 61148522 | 12/1984 |
| WO | WO 97/34273 | 9/1997 |

OTHER PUBLICATIONS

"Touch-Sensitive Pancake", IBM Technical Disclosure Bulleting #88A61790, Oct. 1998.

U.S. Appl. No. 09/835,049, filed Apr. 13, 2001, "Tangential Force Control In A Touch Location Device".

U.S. Appl. No. 09/835,040, filed Apr. 13, 2001, "Method and Apparatus For Force-Based Touch Input".

U.S. Appl. No. 10/121,516, filed Apr. 12, 2002, "Touch Screen with Rotationally Isolated Force Sensor".

U.S. Appl. No. 10/121,507, filed Apr. 12, 2002, "Force Sensors and Touch Panels Using Same".

U.S. Appl. No. 10/140,209, filed May 6, 2002, "Method for Improving Positioned Accuracy for a Determined Touch Input".

U.S. Appl. No. 10/142,118, filed May 8, 2002, "Baselining Techniques in Force-based Touch Panel Systems".

U.S. Appl. No. 10/150,704, filed May 17, 2002, "Correction of Memory Effect Errors in Force-based Touch Panel Systems".

\* cited by examiner

CALIBRATION OF FORCE BASED TOUCH PANEL SYSTEMS

FIELD OF THE INVENTION

The present invention is directed generally to a touch sensing system, and more particularly to a method and system for calibrating a touch screen system for more accurate determination of the location of a touch on the touch screen.

BACKGROUND

A touch screen offers a simple, intuitive interface to a computer or other data processing device. Rather than using a keyboard to type in data, a user can transfer information through a touch screen by touching an icon or by writing or drawing on a screen. Touch screens are used in a variety of information processing applications. Transparent touch screens are particularly useful for applications such as cellphones, personal data assistants (PDAs), and handheld or laptop computers.

Various methods have been used to determine touch location, including capacitive, resistive, acoustic and infrared techniques. Touch location may also be determined by sensing the force of the touch through force sensors coupled to a touch surface. Touch screens that operate by sensing touch force have several advantages over other technologies mentioned above. First, force sensors do not require the touch surface to be composed of special materials that may inhibit optical transmission through the touch surface, as in a resistive touch sensor. Further, force sensors do not rely on a lossy electrical connection to ground, as is required by a capacitive touch screen, and can be operated by a finger touch, gloved hand, fingernail or other nonconductive touch instrument. Unlike surface acoustic wave technology, force sensors are relatively immune to accumulations of dirt, dust, or liquids on the touch surface. Finally, a force sensor is less likely to detect a close encounter with the touch surface as an actual touch, which is a common problem with infrared touch screens.

A force based touch screen may be built with a minimum of three force sensors spaced in a triangular pattern under a touch surface. Such an arrangement may provide signals sufficient to determine the net perpendicular force and the two moments necessary to compute touch location. Touch screen devices also may be built with a larger number of sensors. Commonly, four corner sensors may be used, in part to harmonize with the symmetry of the rectangular touch surface typically required. Upon application of a touch, the forces sensed by the touch screen sensors may be used to determine the touch location. However, determination of the touch location may be affected by a number of factors in addition to the touch force. Twisting, squeezing or otherwise distorting the touch screen during a touch may cause inaccuracies in the touch location determination.

SUMMARY OF THE INVENTION

In general terms, the present invention relates to a method and system for detecting the location of a touch on a touch sensor. Features of the present invention are particularly useful when combined with a microprocessor-based system operating a display device enhanced by a transparent touch screen.

In accordance with one embodiment of the present invention, a method for determining a touch location on a touch screen is provided. The touch screen is defined by a plurality of touch sensors disposed to measure a signal indicative of a touch force component that is perpendicular to a touch surface. The method includes providing calibration parameters for the touch screen acquired using the touch sensors and the touch surface. The calibration parameters characterize an error in an expected touch signal associated with mechanical distortion of the touch screen. A force responsive touch signal having the error is detected and touch location determined using the calibration parameters to compensate for the error.

In another embodiment of the present invention, a method for calibrating a touch screen includes applying a mechanical distortion to the touch screen and detecting a force responsive touch signal arising from the mechanical distortion of the touch screen. Touch signal error associated with the mechanical distortion is characterized and calibration parameters are produced using the characterization of the touch signal error.

In accordance with a further embodiment of the present invention, a touch screen system includes a touch surface, a plurality of force responsive touch sensors mechanically coupled to the touch surface and producing a sensor signal in response to a touch applied to the touch surface, and a control system couple to the touch sensors and receiving the sensor signals. The control system is configured to provide calibration parameters for the touch screen acquired using the touch sensors and the touch surface. The calibration parameters characterize an error in an expected touch signal associated with mechanical distortion of the touch screen. The control system detects a force responsive touch signal having the error and determines a touch location using the calibration parameters to compensate for the error in the touch signal.

In yet another embodiment of the present invention, a touch screen display system includes a touch surface, a plurality of touch sensors, a control system and a display for displaying information through the touch screen system. The control system is configured to provide calibration parameters for the touch screen acquired using the touch sensors and the touch surface. The calibration parameters characterize an error in an expected touch signal associated with mechanical distortion of the touch screen. The control system detects a force responsive touch signal having the error and determines a touch location using the calibration parameters to compensate for the error in the touch signal.

In another embodiment of the present invention, a touch screen calibration system comprises a mechanical distortion system for applying mechanical distortion to the touch screen, a detection system for detecting force responsive sensor signals arising from the mechanical distortion, and a processor coupled to the detection system. The processor is configured to detect a force responsive touch signal arising from the mechanical distortion of the touch screen and characterize a touch signal error associated with the mechanical distortion of the touch screen. The processor is further configured to produce calibration parameters using the characterization of the touch signal error.

A further embodiment of the present invention includes a system for determining a touch location on a touch screen. The touch screen is defined by a plurality of touch sensors mechanically coupled to a touch surface. The system includes means for providing touch screen calibration parameters acquired using the touch surface and the touch sensors, means for detecting a touch signal having the touch signal error, means for correcting the touch signal using the touch screen calibration, and means for determining the touch location using the corrected touch signal. The touch screen calibration parameters characterize a touch signal error associated with a mechanical distortion of the touch screen affecting a touch signal.

In another embodiment of the present invention, a system for calibrating a touch screen is provided. The system includes means for applying mechanical distortion to the touch screen, means for detecting sensor signals associated with the mechanical distortion, and means for calibrating the touch screen to compensate for the mechanical distortion.

In a further embodiment of the present invention, a computer-readable medium is configured with executable instructions for causing one or more computers to perform a method for determining a touch location on a touch screen. The touch screen defined by a touch surface and a plurality of touch sensors disposed to measure a signal indicative of a touch force component that is perpendicular to the touch screen. The method for determining touch location includes providing calibration parameters for the touch screen acquired using the touch sensors and the touch surface, the calibration parameters characterizing an error in an expected touch signal associated with mechanical distortion of the touch screen, detecting a force responsive touch signal having the error; and determining the touch location using the calibration parameters to compensate for the error in the touch signal.

Yet another embodiment of the present invention includes a computer-readable medium configured with executable instructions for causing one or more computers to perform a method of calibrating a touch screen. The method comprises applying mechanical distortion to the touch screen, detecting a force responsive touch signal arising from the mechanical distortion of the touch screen, characterizing a touch signal error associated with the mechanical distortion, the touch signal error arising in a force responsive touch signal, and producing calibration parameters using the characterization of the touch signal error.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
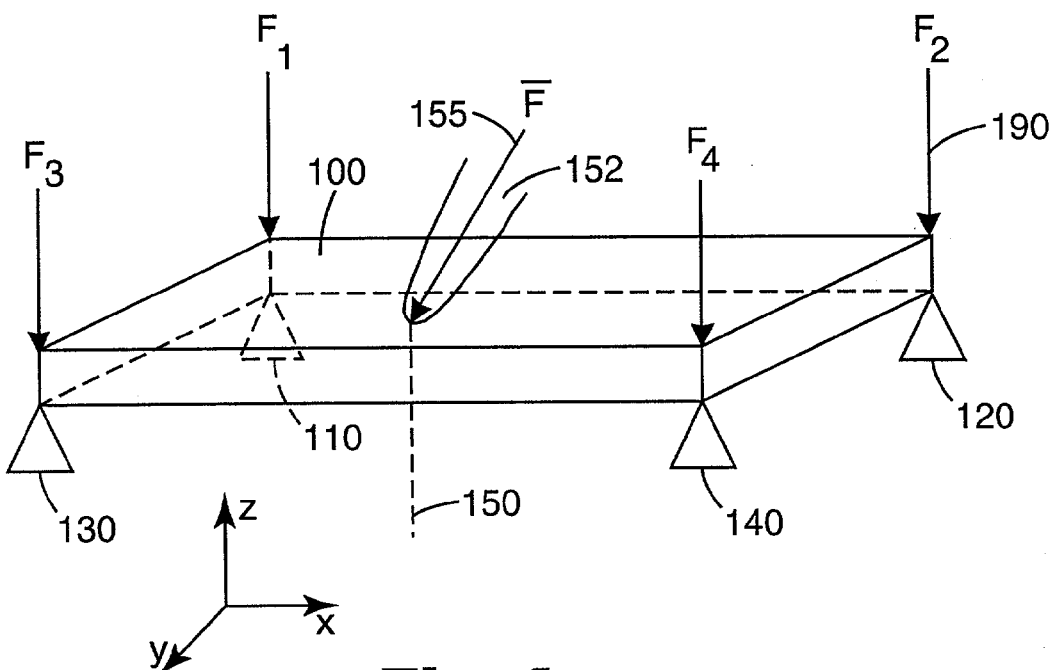
FIG. 1 schematically illustrates a perspective view of a touch screen with force sensors located at the corners of the touch screen in accordance with an embodiment of the invention.

The invention is amenable to various modifications and alternative forms. Specific embodiments of the invention have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings which form a part hereof, and various embodiments by which the invention may be practiced are shown by way of illustration. It is to be understood that other embodiments may be utilized, and structural and functional changes may be made without departing from the scope of the present invention.

As stated above, and for other reasons stated below which will become apparent upon reading the present specification, there is a need for a method and a system for accurately determining the location of a finger touch or an instrument touch on a touch surface. There exists a further need for such a method and system that calculates touch location with correction for mechanical distortions applied to the touch screen during the time in which the touch location information is obtained to determine touch location.

The present invention is applicable to touch sensing techniques and is believed to be useful when features of the present invention are combined with a data processing system operating a display device enhanced by a transparent touch screen. For example, a touch screen of the present invention may be used in a desktop, handheld or laptop computer system, a point-of-sale terminal, personal data assistant (PDA), or a cell phone. Although described in combination with a microprocessor-based system, a touch screen device of the present invention may be combined with any logic-based system, if desired.

The present invention provides for the accurate determination of a touch location on a force based touch screen in the presence of mechanical distortions of the touch screen. A touch may be sensed by a number of touch sensors and represented by one or more touch signals. Accurate touch location determination involves measuring the magnitudes of one or more touch signals during a touch on the touch screen. At the time the touch information is obtained to determine the touch location, the touch screen may be influenced by a number of factors, such as those caused by an operator twisting or squeezing the touch screen device. Such disturbances of the touch screen during a time the touch signal is being processed to determine the touch location may lead to inaccuracies in the calculated touch location.

A perspective view of a rectangular touch screen is schematically illustrated in FIG. 1. A touch surface 100 is shown disposed proximate to force sensors located at respective corners of the touch surface 100. The touch surface 100 and force sensors 110, 120, 130, 140 are located within a touch screen housing (not shown).

As a stylus, finger or other touching device 152 presses the touch surface 100, a touch force 155 is exerted upon the touch surface 100 at the touch location 150. The touch force 155 creates forces F1, F2, F3, F4 on the force sensors 110, 120, 130, 140 perpendicular to the touch surface 100. The force sensors 110, 120, 130, 140 may be driven with an alternating electrical signal. The perpendicular forces F1, F2, F3, F4 cause a change in the capacitance of the force sensors 110, 120, 130, 140, thereby causing the signal coupled through the force sensors 110, 120, 130, 140 to change. The force responsive signals derived from the force sensors 110, 120, 130, 140 may be used to calculate touch location. Although the touch screen illustrated in FIG. 1 is rectangular with sensors located at the corners, various configurations using three or more touch sensors with differing touch surface shapes may also be used.

The sensors 110, 120, 130, 140, may be, for example, small capacitive force sensors constructed of two capacitor plates separated by a gap. A capacitive force sensor may be arranged so that when a touch force of sufficient magnitude and direction is applied to the touch surface, one capacitor plate deflects towards the second plate. The deflection alters the distance between the capacitor plates, changing the capacitance of the sensor. The touch force may be measured by control system circuitry as a change in an alternating electrical signal applied to the touch sensor. One embodiment of a capacitive force sensor appropriate for use in touch screen applications is described in co-owned U.S. patent application, U.S. Ser. No. 09/835,040, filed Apr. 13, 2001, entitled "Method and Apparatus for Force-Based Touch Input," which is hereby incorporated herein by reference.

Figure 2:
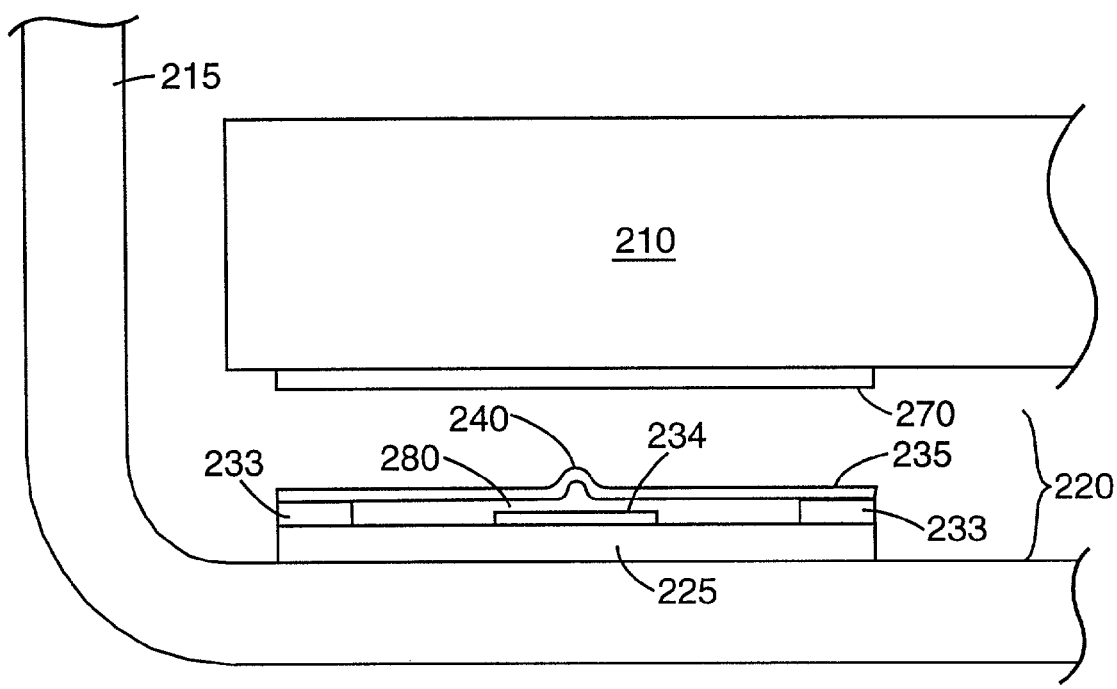
FIG. 2 schematically illustrates a cross-sectional view of a capacitive force sensor in accordance with an embodiment of the invention.

A force sensor is appropriate for use with a liquid crystal display (LCD), cathode ray tube (CRT) or other electronic display, and is schematically illustrated in FIG. 2. In this particular embodiment, the sensor measures the applied force based on the change of capacitance of a capacitive element. A touch surface 210, or overlay, is located within a structure or housing 215. The touch surface 210 is typically transparent to allow viewing of a display or other object through the touch surface. In other applications, the touch surface 210 can be opaque.

The structure or housing 215 may be provided with a large central aperture through which the display may be viewed. If desired, the undersurface of the housing 215 may be seated directly against the surface of such a display, over the border surrounding its active area. In another embodiment, as mentioned above, the overlay may be replaced by a structure including a display unit, such as an LCD.

A capacitive sensor 220 may be positioned between the touch surface 210 and the housing 215. An interconnect 225, with attachment lands 233, may be coupled to the housing 215 by soldering, cementing, or by other methods. A conductive area forms a first conductive element 234 on the interconnect 225. A second conductive element 235 with a central protrusion 240, for example a dimple, may be attached to the lands 233 of the interconnect 225 by soldering, for example. A small gap 280 is formed between the first conductive element 234 and the second conductive element 235, either by the shape of the second conductive element 235, or by the process of attaching the second conductive element 235 to the interconnect 225. The width of the gap 280 may be approximately 1 mil, for example. A capacitor is formed by the conductive elements 234, 235 separated by the gap 280.

An optional bearing surface 270 may be interposed between the touch surface 210 and the second conductive element 235. This may protect the underside of touch surface from indentation or from damage by the protrusion 240, especially in cases where the overlay is made of softer material. The bearing surface 270 may also mount to the touch surface 210 through a thin layer (not shown) of elastomer or of highly pliable adhesive, thereby providing a lateral softening function. It will be appreciated that, in normal operation, the touch surface 210 or bearing surface 270 is in contact with the protrusion 240: these elements are shown separated only for clarity in the illustration.

The second conductive element 235 combines the functions of a spring and a capacitor plate. As a perpendicular force is applied to the touch surface 210, the second conductive element 235 flexes, decreasing the width of the gap 280 and increasing the capacitance of the sensor 220. This change in capacitance may be measured and related to the force applied to the touch surface 210. Although a touch screen using capacitive force sensors is described, other types of force sensors may be used in a similar manner, including, for example, piezoelectric sensors and strain gauge sensors.

One of the advantages of a force-based touch screen is that the number of optically distinct layers positioned between the display unit and the user is low. Typically, the overlay positioned over the display unit is a single layer of glass or relatively stiff polymer, for example polycarbonate or the like, which may be chosen for suitable optical qualities. This contrasts with other types of touch screen, such as resistive or capacitive touch screens, that require several, potentially optically lossy, layers over the display unit. The electrically conductive thin films required in resistive or capacitive touch screens typically have a high index of refraction, leading to increased reflective losses at the interface. This is a particular problem in resistive screens where there are additional solid/air interfaces and where antireflection coatings are not useful, since the conductive layers must be able to make physical contact. A screen overlay for a force-based touch screen, however, has only its upper and lower surfaces; these may be treated to reduce reflective losses and to reduce glare. For example, the overlay may be provided with matte surfaces to reduce specular reflection, and/or may be provided with anti-reflection coatings to reduce reflective losses.

Touch signals representing the force of a touch acting on the touch screen are produced by one or more touch sensors coupled to a touch surface of the touch screen. A touch signal may be derived from a single sensor, or by combining sensor signals from two or more touch sensors. Determination of a touch location involves analyzing the sensor signals produced by the touch sensors. A tap touch in a single location characteristically produces a touch signal that increases in magnitude as the touch is applied and then decreases in magnitude as the touch is removed. A touch may be a continuing touch wherein the touch remains on the touch surface for a period of time. For example, the touch may be present in a single location for a period of time. Further, the touch may be a "streaming touch," wherein the touch is applied at one location, moved across the surface of the touch screen, and removed at another location, causing the generation of a continuously changing signal at each sensor.

Calculation of the touch location at any time, t, may be performed, for example in a four sensor screen, using combinations of the force responsive sensor signals $f_1(t), f_2(t), f_3(t), f_4(t)$. The force responsive signals generated by the touch sensors may be used to calculate various touch signals, including the moment about the y-axis, $M_Y(t)$, moment about the x-axis, $M_x(t)$, and the total z-direction force, $F_Z(t)$. The coordinates of the touch location may be determined from the touch sensor signals, as provided in Equation 1. Assuming a reference point in the center of the touch screen, a perfectly rigid touch surface, ideal conditions, with no errors, background fluctuations or disturbances present other than the touch force, The force and moments employed in Equation 1 may be evaluated as in Equation 1b.

$$X(t) = \frac{M_Y(t)}{F_Z(t)} \quad [1]$$

$$Y(t) = \frac{M_X(t)}{F_Z(t)}$$

where, for this particular case, $M_X(t) = (f_1(t)+f_2(t)) - (f_3(t)+f_4(t));$ $M_Y(t) = (f_2(t)+f_4(t)) - (f_1(t)+f_3(t));$ and $F_Z(t) = f_1(t)+f_2(t)+f_3(t)+f_4(t).$ [1b]

Figure 3:
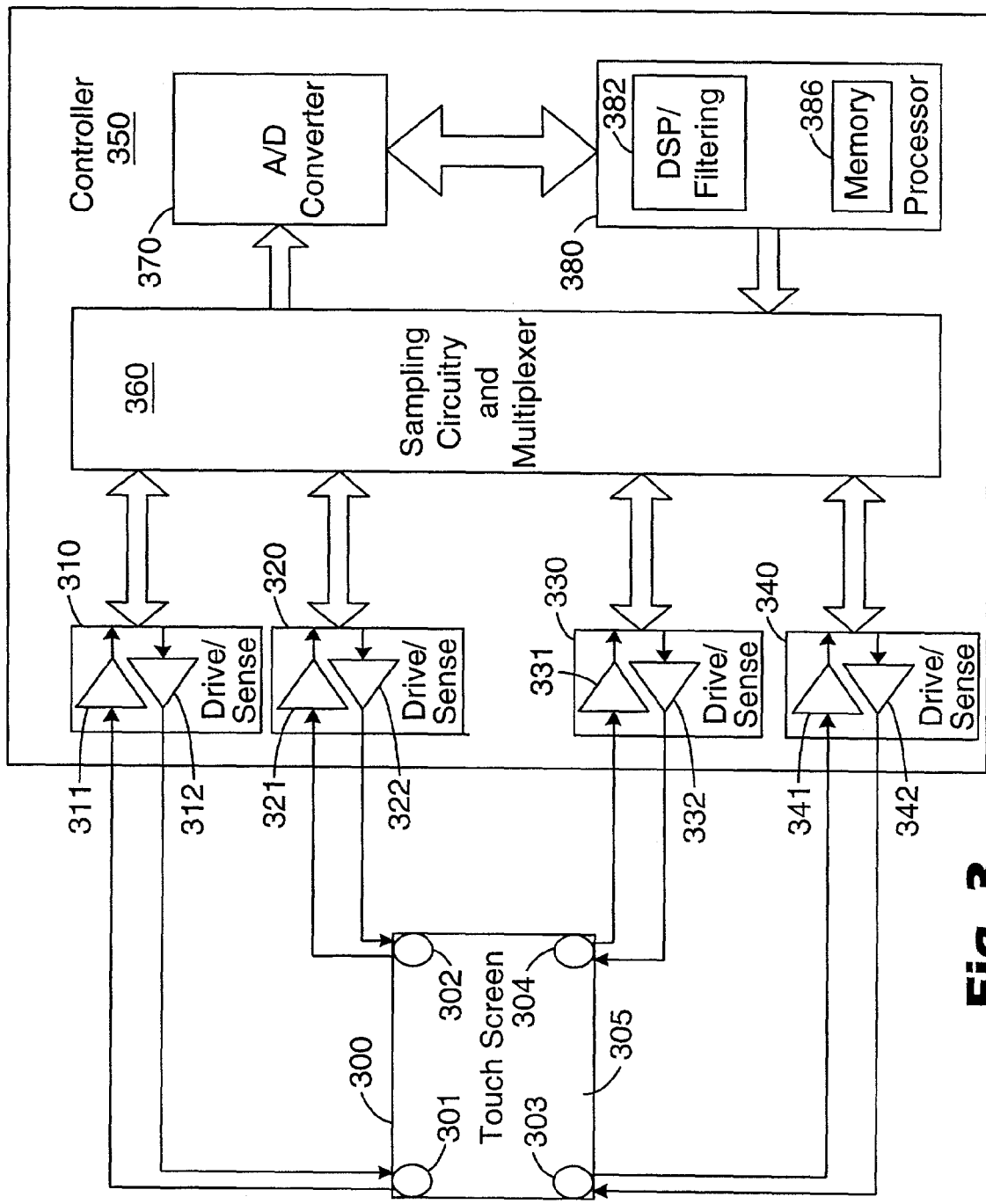
FIG. 3 is a block diagram of a touch screen and touch screen control system in accordance with an embodiment of the invention.

The sensor signals are directed to a control system that determines a touch location from the force responsive sensor signals. FIG. 3 schematically illustrates a block diagram of a touch screen 300 and touch screen control system 350 arranged in functional blocks in accordance with the principles of the present invention. It will be appreciated that there exist many possible configurations in which these functional blocks may be arranged. The example depicted in FIG. 3 is one possible functional arrangement.

In the exemplary embodiment illustrated in FIG. 3, a touch surface 305 is configured proximate to four force sensors 301, 302, 303, 304 arranged at the respective corners of the touch surface 305. The touch surface 305 and force sensors 301, 302, 303, 304 are arranged in a touch screen housing (not shown). The sensors 301, 302, 303, 304 may be chosen from a variety of sensing technologies, including capacitive, piezoelectric and strain gauge sensors. The sensors 301, 302, 303, 304 measure the force of a touch detected at the sensor locations and are coupled to drive/sense circuitry 310, 320, 330, 340 located within the control system 350. Alternatively, some components of the drive/sense circuitry may be located near the corresponding sensor. An energizing signal developed in the drive circuitry 312, 322, 332, 342 for each sensor is used to energize the sensors 301, 302, 303, 304. Each sensor 301, 302, 303, 304 produces a touch force signal corresponding to a touch force applied to the sensor through the touch surface 305. The touch force signal developed by each sensor 301, 302, 303, 304 is detected by sense circuitry 311, 321, 331, 341 located within the control system 350.

Analog voltages representing the touch force at each sensor location are produced by the sense circuitry 311, 321, 331, 341. The analog voltages are sampled and multiplexed by the sampling circuitry 360 at a rate sufficient to acquire an adequate representation of the force responsive sensor signals for determining touch presence and location. The sampled signals are digitized by an analog to digital (A/D) converter 370. The digitized sensor signals are directed to processor circuitry 380. The processor circuitry 380 performs calculations to determine a touch location. The processor circuitry 380 may also include filtering circuitry 382 for signal conditioning and memory circuitry 386 for storage of touch signal values. The processor circuitry 380 may also include one or more timers 384 for determining various interval and delay timing of the touch signal associated with determination of the preferred time for making the touch location measurement. The processor circuitry 380 may perform a number of additional control system functions, including controlling the touch signal sampling circuitry 360, the multiplexer circuitry 360, and the A/D converter 370.

It may be found advantageous to implement the touch screen control system 350, or its equivalent, on a single mixed-mode integrated circuit chip. In such an implementation, it may be advantageous to replace sampling circuitry 360 and A/D converter 370 with a set of delta-sigma converters operating in parallel, one for each signal channel.

Figure 4:
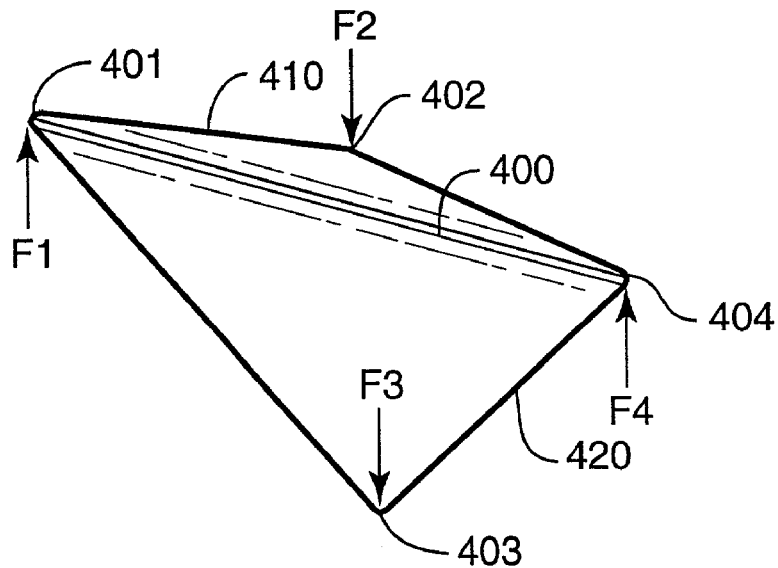
FIG. 4 schematically illustrates a touch screen under torsion.

Consider a force touch screen in a thin portable device, such as a PDA. Take the case to be one wherein the device is roughly rectangular in outline, with a rectangular touch surface supported by four force sensors near the corners as depicted in FIG. 4. While one hand holds a stylus to apply touches to the surface, the opposite hand may be holding the device against a table, or grasping it free of any surface support. Uneven pressure from this opposite hand may serve to twist the enclosure, leading to a pattern of forces, such as, for example, F1, F2, F3, and F4 applied to the enclosure at or near its corners. This causes a torsional distortion of the touch screen device, such that a line along one edge 410 of the device tends to move very slightly out of parallel with an opposing edge 420. The touch surface will, to some degree, resist following this distortion of the support structure of the touch screen, such that the forces in one diagonally opposing pair of force sensors, located at diagonally opposing corners 402 and 403 become less positive (or more negative), while the forces located at corners 401 and 404 change by an equal amount in the opposite sense.

While the grasping or restraining hand applies a force of perhaps 100 grams downward on opposing device corners 402, 403, equilibrium may be sustained by equal upward reaction forces at the other two corners 401, 404. Since a substantial portion of the entire device stiffness may reside in the touch overlay, the torsional force applied to it through the sensors may be a substantial portion of the total applied to the device. If this portion is one-quarter, for instance, then the sensors in this example may each experience + or −25 grams of torsionally applied force. At the same time, a 20-gram touch force applied to the center of the screen should appear as a 5-gram addition to each sensor. The force from the restraining hand may fluctuate rapidly. The signal resulting from the touch force, indicating the touch location, then, may be several times smaller than a simultaneously present fluctuating interference.

In a second example, consider a public-access display equipped with a robust, vandal-resistant touch screen. Such a screen may be very thick and rigid. The weight of moving equipment, the pressure of wind on the building, or even the weight of passing footsteps may cause small torsional distortions in a kiosk-type or wall mounted enclosure. The result may again be a significant and varying torsional force pattern applied to the sensors.

Difficulties of the sort just discussed may arise whenever a force-based touch location is to be derived from a surface supported on more than three sensors. Although touch location may be determined using a minimum of three force sensors, certain advantages may mandate the use of a larger number. Additional points of support for the touch surface, for example, may prevent it from flexing excessively in response to touch forces. Conversely, to the extent that the support structure beneath the touch screen flexes, sensor connections beyond the third sensor may serve to constrain the touch surface to flex in concert. Both of these effects reduce relative motion between the edges of the touch surface and any surrounding frame or bezel, and between the touch surface structure in general and the structures below. There may be seals, preload springs, or other connections running between the touch surface and the larger device that shunt varying forces around the force sensors in response to such relative motion. As these unmeasured shunt forces may lead to errors in force location, their reduction can be advantageous. Reduction is achieved, however, by passing forces tending to distort one structure, into another through the force sensors. This may itself become a source of inaccuracies.

With three force sensors, each combination of position and perpendicular touch force may be associated with a specific set of sensor values. When more than three sensing connections support a touch surface structure, however, there is no longer a one-to-one relationship between touch locations and sensor response patterns. The division of perpendicular touch force among more than three sensors is a statically indeterminate problem, and the many different possible response patterns for a given touch are seen to result from different patterns of device strain.

In an idealized situation where the support structure and touch screen are perfectly rigid, strain patterns within the touch surface structure and support structure remain constant throughout the course of a touch. In this idealized situation of perfect rigidity, the change in sensor outputs from a moment before a touch to one during it would be characterized by a single fixed pattern as with the case of only three sensors. In this situation, the relative magnitudes of the different sensor output changes would depend only on the location touched. Touch location may be computed from such pre-touch to during-touch changes. Assuming, then, that forces from internal strain are not excessive for the force sensors, it is seen that the assumption of perfect rigidity simplifies the calculation of touch location.

Slightly flexible structures may, however, be more practical or more cost effective. Such flexible structures may change strain pattern during the course of a touch, due either to the stress of the touch force itself, or due to independently changing stresses applied to the support structure.

In an ideally calibrated force-touch screen with somewhat flexible structure, the total force signal and two moment signals needed for touch location computation are formed from precise linear combinations of the sensor outputs, these combinations having the property of canceling exactly to report zero total force and moment values for patterns of perpendicular sensor force arising from indeterminacy and device flexure. The coefficients employed for such combinations, at whatever level of accuracy achieved, may be termed a "calibration" for the touch screen in question. A fully accurate calibration may reflect the exact locations and sensitivities of the force sensors, along with any electronic sensitivities or cross-talk. Imprecise calibration values may lead to location errors. Those resulting from varying mechanical distortion of the touch screen may be unexpectedly large, and may benefit from special attention in the calibration process. For clarity in the discussion below, a calibration prepared without special attention to potential inaccuracies from distortion will be termed a "basic calibration".

For a force-based touch screen with n sensors, Let vector $\vec{F}(t)$ represent the set of all sensor values at time t collected together into a list in a predetermined order:

$$\vec{F}(t) = [f_1(t), \ldots f_n(t)] \quad [2]$$

The variable t may be taken to be the continuous-valued time, or the discrete-valued sample number, to which the data correspond, as convenient.

The coefficients of combination comprising the calibration may also be collected together into vectors $\vec{C}_Z$, $\vec{C}_Y$, and $\vec{C}_X$:

$$\vec{C}_Z = [c_{Z1}, \ldots c_{Zn}]$$

$$\vec{C}_Y = [c_{Y1}, \ldots c_{Yn}]$$

$$\vec{C}_X = [c_{X1}, \ldots c_{Xn}] \quad [3]$$

These associate the proper weights with the sensor channels, such that:

$$F_Z(t) = \vec{C}_Z \cdot \vec{F}(t)$$

$$M_Y(t) = \vec{C}_Y \cdot \vec{F}(t)$$

$$M_X(t) = \vec{C}_X \cdot \vec{F}(t) \quad [4]$$

where $F_Z(t)$ represents the perpendicular component of total touch force, $M_Y(t)$ represents the moment of the touch force about the desired Y-axis, and $M_X(t)$ represents the moment of the touch force about the desired X-axis. The desired axes in question are those of that coordinate grid, lying in the touch plane, with respect to which touch location is to be reported. The units in which $M_Y(t)$ and $M_X(t)$ are represented may be any convenient choice, and may be different for the two axes. In particular, they may be chosen such that final touch coordinates may be computed directly using Equation 1, repeated below for convenience:

$$X(t) = \frac{M_Y(t)}{F_Z(t)} \quad [1]$$

$$Y(t) = \frac{M_X(t)}{F_Z(t)}$$

These coordinates may normally be calculated and reported only at times when the magnitude of $F_Z(t)$ is such as to indicate the presence of a deliberate touch that is strong enough to be accurately located. Only one touch location may be reported, or many successive locations may be reported for a continuing touch.

When there are more than three sensors, the vectors $\vec{C}_Z$, $\vec{C}_Y$, and $\vec{C}_X$ allow for n−3 additional vectors mutually orthogonal to these and to each other. These additional vectors may be added in arbitrary proportion to an existing set of sensor outputs without changing a computed touch location. Furthermore, if the calibration vectors are perfectly accurate, these additional vectors may correspond to distinct patterns of perpendicular sensor force associated with static indeterminacy, whereby such indeterminacy forces need not cause error. In particular, when n=4, the single such vector may correspond to overall torsional flexure of the device. However, if the calibration vectors are not perfectly accurate, this one orthogonal vector may not exactly match the sensor output from torsion. Then fluctuating torsion, especially arising from potentially large forces applied to the support structure, may lead to location errors.

Figure 5:
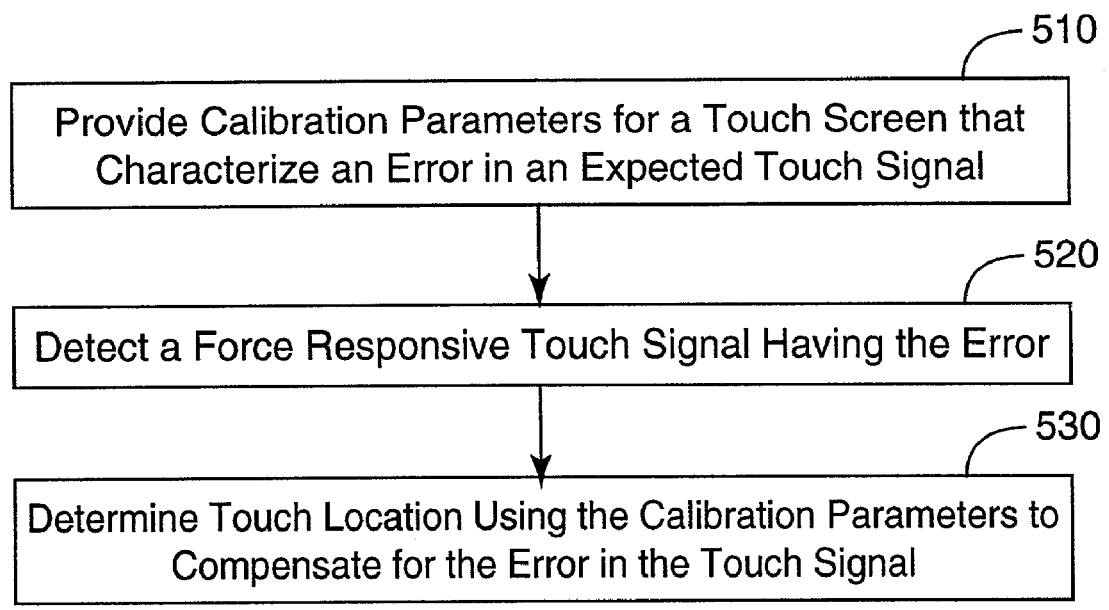
FIG. 5 is a flowchart conceptually illustrating a method for determining touch location using a characterization of an error associated with distortion of the touch screen in accordance with an embodiment of the invention.

One aspect of the present invention is directed to reducing the effect of mechanical distortions of the touch screen, such as torsion, on the determination of the touch location on the touch screen. Mechanical distortions of the touch screen may arise from the exemplary situations discussed above, or from other mechanical distortions affecting the accuracy of the touch location measurement. FIG. 5 illustrates, in broad and general terms, a method of reducing the effect of mechanical distortion of the touch screen to increase touch location accuracy. Calibration parameters acquired using the touch surface and the touch sensors are provided 510. The calibration parameters characterize an error in an expected touch signal associated with mechanical distortion of the touch screen. A touch signal having the error is detected 520. The touch location is determined using the calibration parameters to compensate for the error in the touch signal 530.

Figure 6:
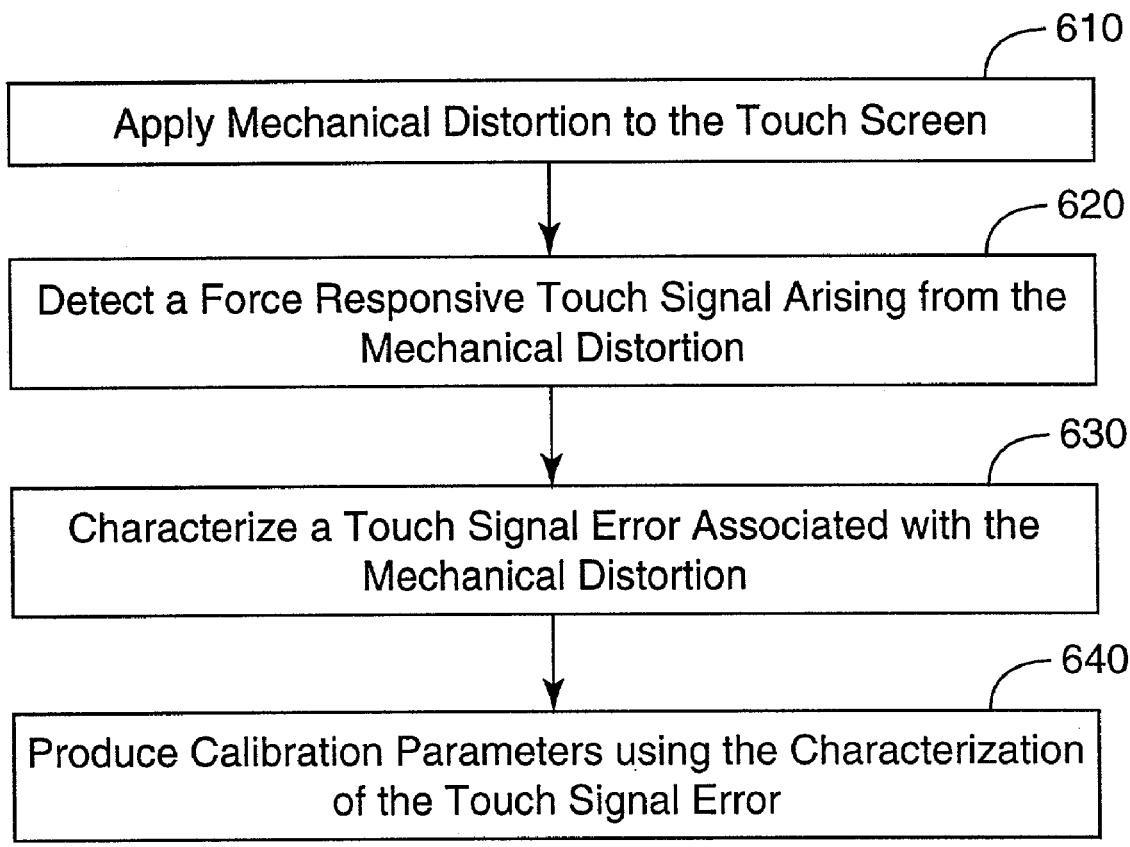
FIG. 6 is a flowchart conceptually illustrating a method for characterizing an error caused by distortion of the touch screen in accordance with an embodiment of the invention.

Another aspect of present invention is directed to a method and system for characterizing the effect of mechanical distortions on the touch signal. FIG. 6 illustrates, in broad and general terms, a method for determining calibration parameters characterizing the effect of mechanical distortion on the touch screen. One or more deliberate mechanical distortions are applied to the touch screen 610. The force responsive touch signals arising from the mechanical distortion of the touch screen are detected 620. The touch signal error associated with the mechanical distortion is characterized 630. Calibration parameters are produced using the characterization of the touch signal error 640.

Figure 7:
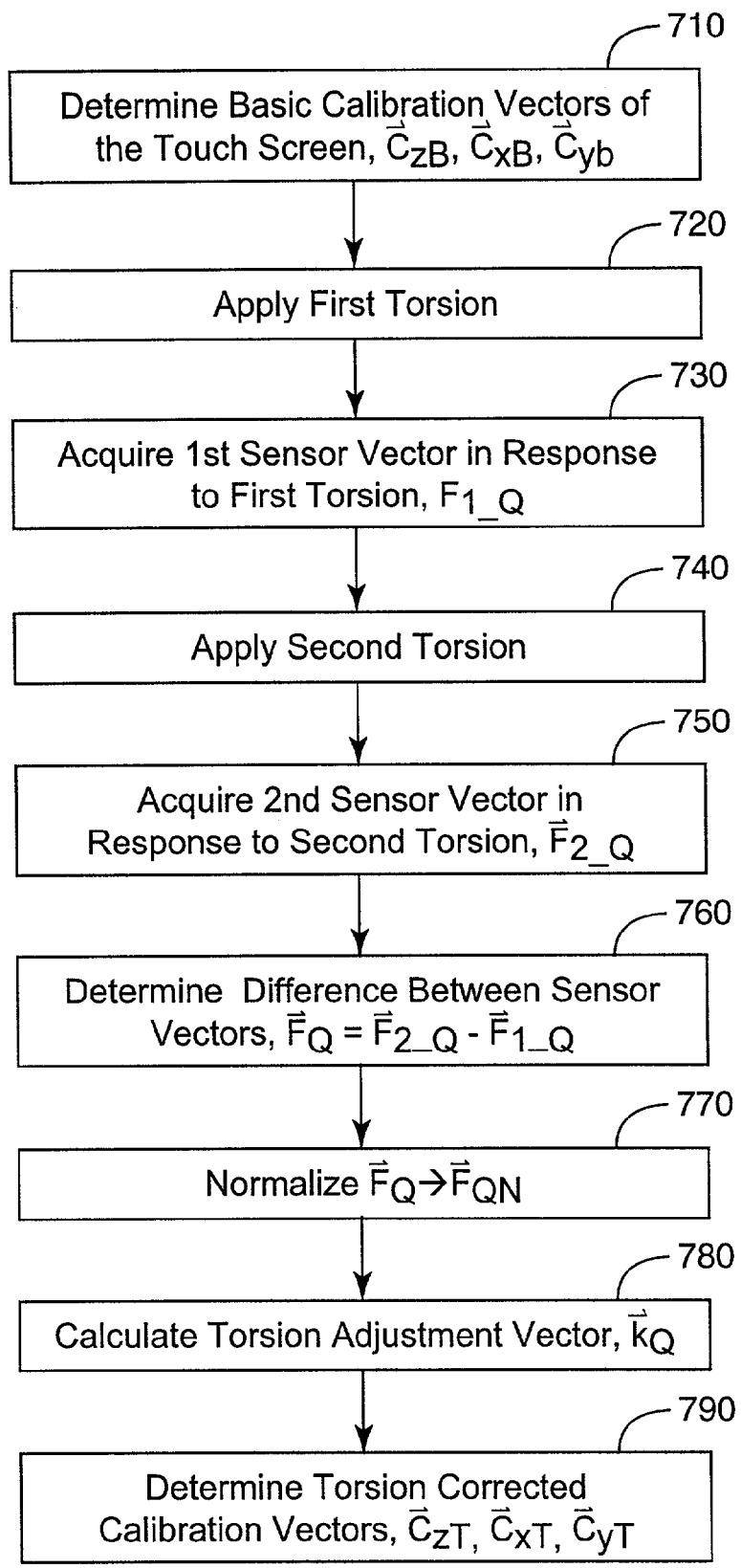
FIG. 7 is a more detailed flowchart conceptually illustrating a method for characterizing an error caused by distortion of the touch screen in accordance with an embodiment of the invention.

In accordance with one approach, a method for characterizing the error associated with touch screen torsion is conceptually illustrated in the flowchart of FIG. 7. A basic calibration may be obtained in addition to the characterization of the mechanical distortion. The basic calibration may be calculated from either the nominal sensor locations and sensitivities of the touch screen design, or from sensor locations and sensitivities measured on a unit by unit basis.

Following basic calibration, two sets of force sensor output values are accumulated, corresponding to two different states of torsion. Both are accumulated while no force is externally applied to the touch surface. The differences formed by subtracting the second set of sensor output values from the first may then be normalized to a vector of unit magnitude, and the result taken to be the normalized response vector to torsion. Thus, for contrasting sets of values taken at times $t_{Q1}$ and $t_{Q2}$, the torsion response vector, $\vec{F}_Q$, may be given by:

$$\vec{F}_Q = [f_{Q1}, f_{Q2}, f_{Q3}, f_{Q4}] = [f_1(t_{Q2}), f_2(t_{Q2}), \quad [5]$$
$$f_3(t_{Q2}), f_4(t_{Q2})] - [f_1(t_{Q1}), f_2(t_{Q1}), f_3(t_{Q1}), f_4(t_{Q1})]$$

and a parallel vector of unit length may be given by:

$$\vec{F}_{QN} = \frac{\vec{F}_Q}{\sqrt{\vec{F}_Q \cdot \vec{F}_Q}}, \text{ whereby } \vec{F}_{QN} \cdot \vec{F}_{QN} = 1. \quad [6]$$

Figure 8A:
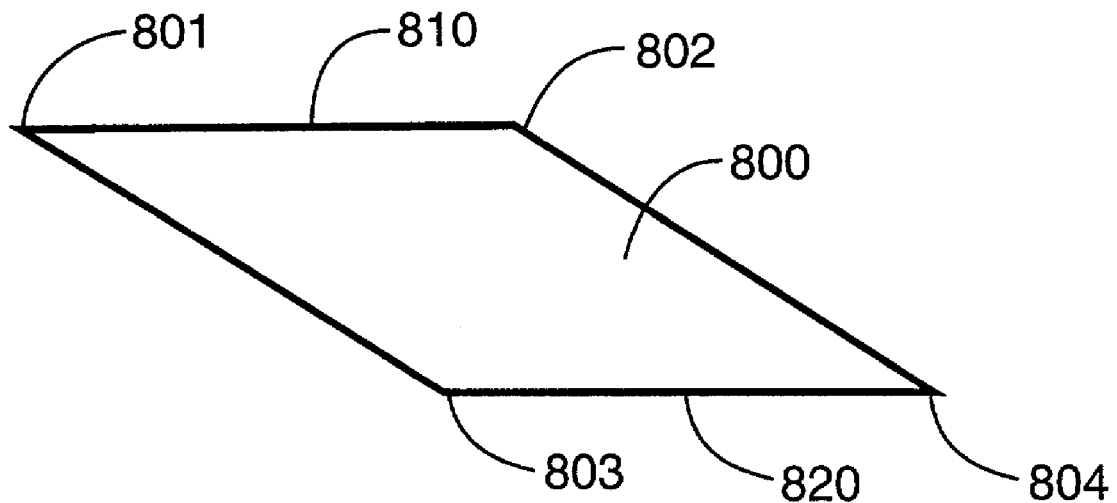
FIGS. 8A and 8B schematically illustrate a method of applying two different support strain configurations to a touch screen in accordance with an embodiment of the invention.

More particularly, an embodiment of a method for the collection of torsion-responsive sensor data may be described as conceptually illustrated in the flowchart of FIG. 7 and the touch screen diagrams of FIGS. 8A–B and FIGS. 9A–B. Following a determination of the basic calibration of the touch screen 710, a first degree of deliberate mechanical distortion may be applied to the touch screen 720. A first set of sensor response values may be measured with the first degree of torsion applied 730 and with no touch or other force applied to the touch surface. In one example, the first degree of torsion may simply be a condition of zero torsion, as illustrated in FIG. 8A. The first set of sensor response values is taken from an unstressed touch surface 800 where touch sensors located at corners 801, 802, 803 804 experience no perpendicular force or mechanical distortion of the touch surface 800.

Figure 8B:
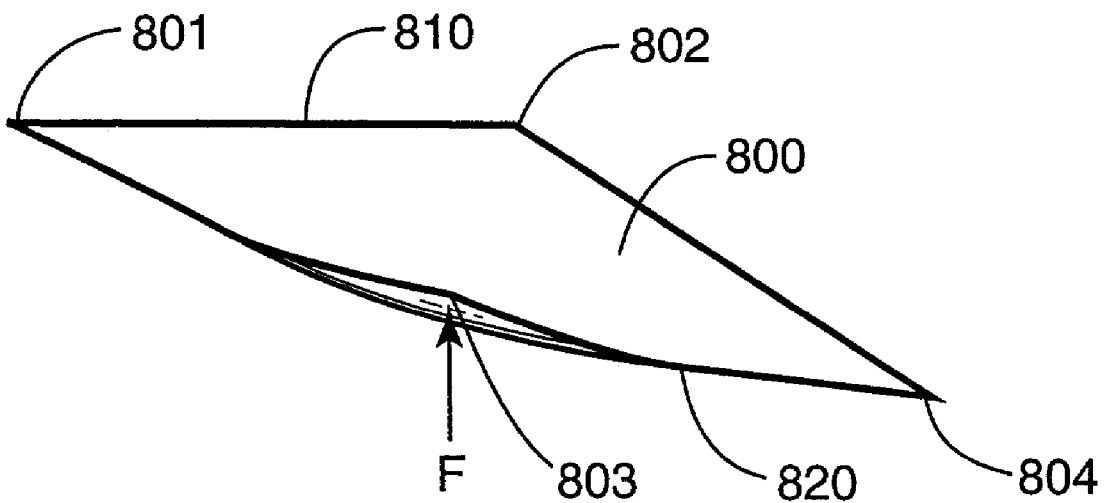
Figure 9A:
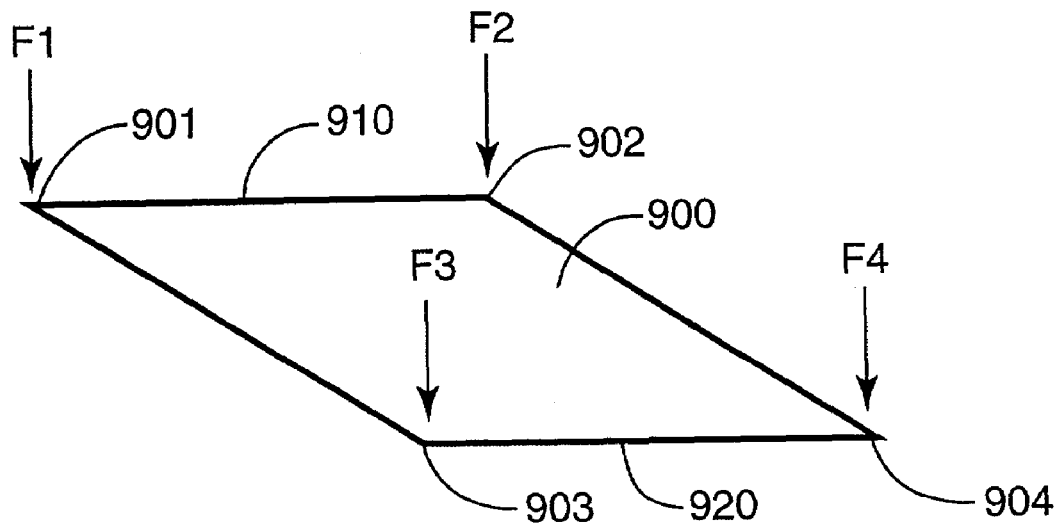
FIGS. 9A and 9B schematically illustrate another method of applying two different support strain configurations to a touch screen in accordance with an embodiment of the invention.
Figure 9B:
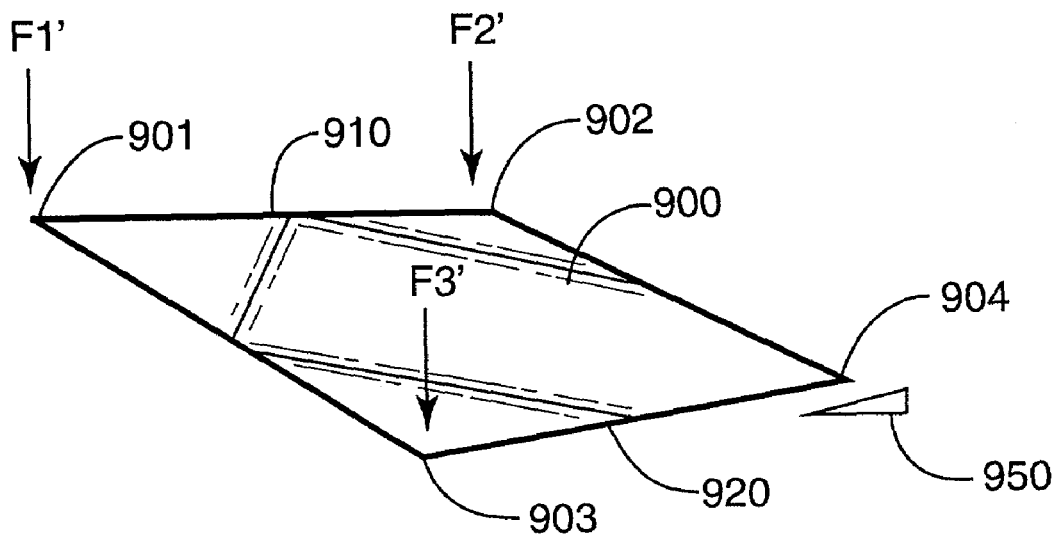

A second deliberate torsion may then be imposed on the touch screen 740, and a second set of force sensor outputs measured 750, again while no force is externally applied to the touch surface. A satisfactory deliberate distortion may be achieved, for example, by an apparatus that applies an upward force under one corner 803 of the device, as illustrated in FIG. 8B. while the other three corners 801, 802, 804 are held stationary. Alternatively, the first set of sensor response values may also be measured with a deliberate mechanical distortion applied, but with effect opposite to that of the second set.

In some configurations, the weight of the device itself is a sufficient source of distorting force. In this configuration, illustrated in FIG. 9, the touch sensors may experience the weight of the touch surface 900 equally distributed to the sensors as forces $f_1(t_1)$=F1, $f_2(t_1)$=F2, $f_3(t_1)$=F3 and $f_4(t_1)$= F4 carried at corners 901, 902, 903, 904 of the touch surface 900. A shim 950 may be inserted under one corner 904 of the touch screen to apply a first deliberate torsion to the touch screen corresponding to altered forces $f_1(t_2)$=F1', $f_2(t_2)$=F2', $f_3(t_2)$=F3' and $f_4(t_2)$=F4' at touch sensors located at corners 901, 902, 903, and 904, respectively. The shim 950 may simply be moved from under one corner to under an adjacent corner to apply a second deliberate torsion to the touch screen.

Turning back to FIG. 7, the difference between the two different sets of force sensor output values, corresponding to two different states of torsion are formed by subtracting the second set from the first 760 and then normalizing the resultant vector 770 to a vector of unit magnitude. The resulting vector represents the normalized response vector to torsion. Because neither external force nor moment is present during the application of pure torsion, calibration vectors $\vec{C}_{ZB}$, $\vec{C}_{YB}$ and $\vec{C}_{XB}$ acquired from the basic calibration should be orthogonal to the normalized response vector to torsion:

$$0 \stackrel{?}{=} \vec{C}_{ZB} \cdot \vec{F}_Q$$

$$0 \stackrel{?}{=} \vec{C}_{YB} \cdot \vec{F}_Q$$

$$0 \stackrel{?}{=} \vec{C}_{XB} \cdot \vec{F}_Q \qquad [7]$$

These conditions will hold only within the limits of the calibration accuracy. However, a torsion-corrected calibration $\vec{C}_{ZT}$, $\vec{C}_{YT}$, $\vec{C}_{XT}$ may be obtained from a basic calibration $\vec{C}_{ZB}$, $\vec{C}_{YB}$, and $\vec{C}_{XB}$ by taking each of its vectors in turn, and removing any part parallel to the pure torsion response. This may be accomplished by subtracting an adjustment vector from each basic calibration vector. The adjustment vector may in each case be formed 780 by multiplying the normalized response vector to torsion by its own dot product with the calibration vector in question:

$$k_{QZ} = \vec{C}_{ZB} \cdot \vec{F}_{QN}$$

$$k_{QY} = \vec{C}_{YB} \cdot \vec{F}_{QN}$$

$$k_{QX} = \vec{C}_{XB} \cdot \vec{F}_{QN} \qquad [8]$$

The distortion corrected calibration vectors may then be determined 790 by difference between the basic calibration and the product of the appropriate adjustment factor by the normalized response of the touch screen to torsion.

$$\vec{C}_{ZT} = \vec{C}_{ZB} - k_{QZ} \vec{F}_{QN}$$

$$\vec{C}_{YT} = \vec{C}_{YB} - k_{QY} \vec{F}_{QN}$$

$$\vec{C}_{XT} = \vec{C}_{XB} - k_{QX} \vec{F}_{QN} \qquad [9]$$

Before discussing further embodiments of the method of the invention, it is appropriate to briefly consider certain methods for developing a basic calibration for a force touch screen. Subject to certain assumptions, it can be shown that a basic calculated calibration may be obtained from:

$$\vec{C}_{ZB} = [s_1, \ldots s_n]$$

$$\vec{C}_{YB} = [s_1 y_1, \ldots s_n y_n]$$

$$\vec{C}_{XB} = [s_1 x_1, \ldots s_n x_n] \qquad [10]$$

where $x_i$, $y_i$ is the location at which a touch force passes into the $i^{th}$ sensor, as measured in the desired output location coordinates, and where $s_i$ scales and standardizes the sensitivity of the $i^{th}$ sensor and its associated electronics. That is, if $f_{test\_i}$ is the change in sensor i output in response to a true perpendicular sensor test force $F_{test\_i}$ passing through, then:

$$s_i = \frac{F_{test\_i}}{f_{test\_i}} \qquad [11]$$

The accuracy of such a directly calculated calibration may be compromised by certain factors. Among these may be inaccuracy in the measurements of sensitivity or coupling position, the presence of parallel paths for perpendicular force other than the sensors, and the presence of significant channel-to-channel cross talk in the wiring or electronics.

In addition, the method of obtaining a calculated calibration, as so far described, makes no provision for especially low susceptibility to torsional error. This may be improved upon, however, by applying the torsion response corrections as described above to the basic calibration vectors, $\vec{C}_{ZB}$, $\vec{C}_{YB}$, $\vec{C}_{XB}$, to achieve a torsion corrected calibration vectors, $\vec{C}_{ZT}$, $\vec{C}_{YT}$, $\vec{C}_{XT}$.

A example of a basic calibration and its nominal calculated value is considered below. With four sensors, the basic form is given by:

$$\vec{C}_{ZB} = [s_1, s_2, s_3, s_4]$$

$$\vec{C}_{YB} = [s_1 y_1, s_2 y_2, s_3 y_3, s_4 y_4]$$

$$\vec{C}_{XB} = [s_1 x_1, s_2 x_2, s_3 x_3, s_4 x_4] \qquad [12]$$

Returning to FIG. 1, we assume that the four corner sensors are precisely located, and have the exactly desired sensitivity, which we will assume to be unity. We further assume that the desired touch coordinate system should have its origin in the screen center, that X and Y should each range from −1.00 to +1.00, and that the edges of this range should extend to the sensors. The upper left sensor is then located by: $[x_1, y_1] = [-1, +1]$, the upper right sensor by: $[x_2, y_2] = [+1, +1]$, the lower left sensor by: $[x_3, y_3] = [-1, -1]$, and the lower right sensor by: $[X_4, y_4] = [+1, -1]$. This yields:

$$\vec{C}_{ZB\_FIG1} = [1, 1, 1, 1]$$

$$\vec{C}_{YB\_FIG1} = [1, 1, -1, -1]$$

$$\vec{C}_{XB\_FIG1} = [-1, 1, -1, 1] \qquad [13]$$

With this, or with any other exactly rectangular array of equally sensitive sensors, the normalized response to torsion is given by:

$$\vec{F}_{QN\_FIG1} = [-\tfrac{1}{2}, \tfrac{1}{2}, \tfrac{1}{2}, -\tfrac{1}{2}], \qquad [14]$$

which is orthogonal to the nominal calibration vectors.

Figure 10:
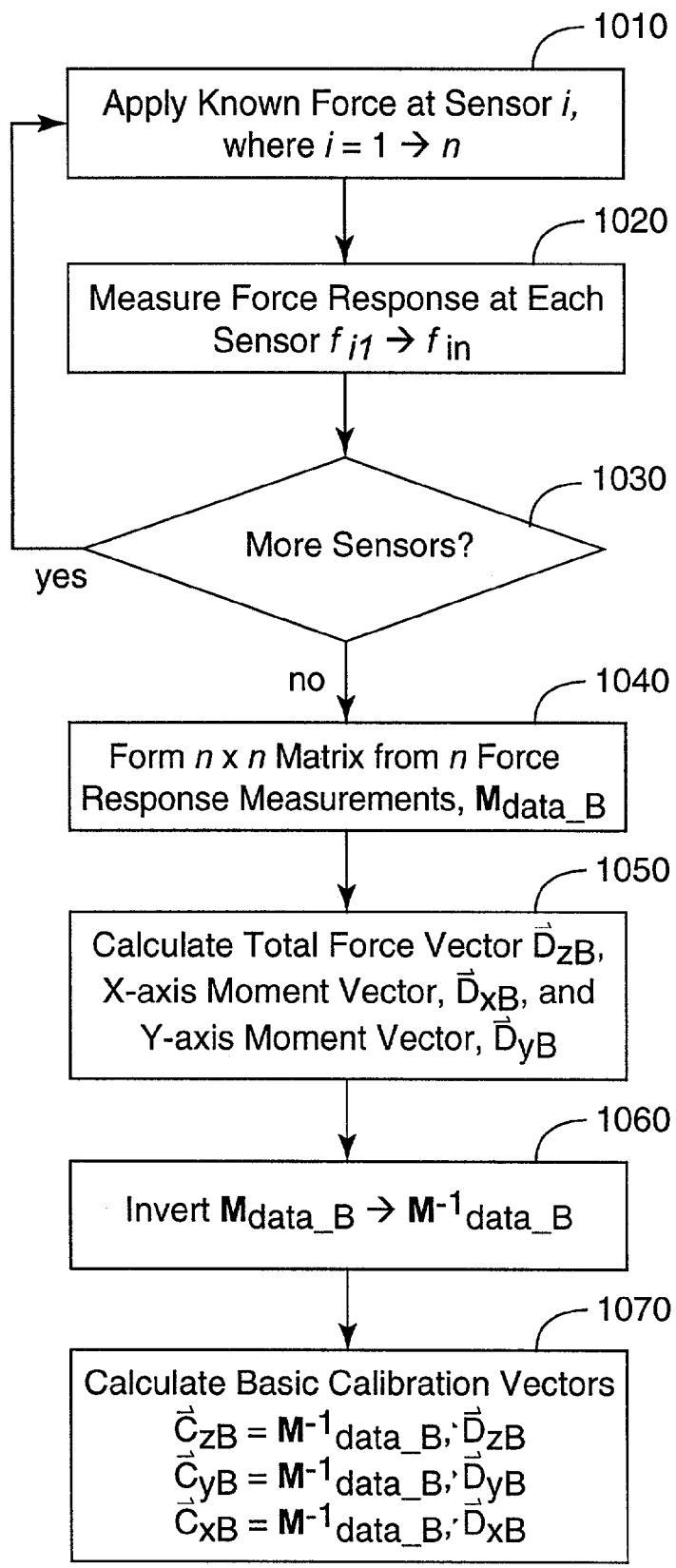
FIG. 10 is a flowchart of a method of determining a basic calibration of the touch screen in accordance with an embodiment of the invention.

In another approach, basic calibration vectors may be calculated on a unit-by-unit basis from sets of sensor response values measured in response to test forces applied to the touch surface of each completed unit. This approach may be advantageously simple and accurate. Determination of the basic calibration vectors by this method is conceptually illustrated in the flowchart of FIG. 10. In accordance with this approach, a known force is applied in the vicinity of a touch sensor 1010. The force response of each force sensor is measured 920. The process of applying a known force at a sensor 910 and measuring the resultant response from each sensor 1020 is repeated until a known force has been applied in the vicinity of each of n touch sensors 1030.

An n×n data matrix $M_{DATA\_B}$ may be formed from the responses of the n touch sensors to the known forces applied at each of n touch sensors 1040. A vector representing the total force $\vec{D}_{ZB}$ the Y-axis moment $\vec{D}_{YB}$ and the X-axis moment $\vec{D}_{XB}$ may be formed from the known force values 1050. The data matrix $M_{DATA\_B}$ may then be inverted 1060 to form $$M_{DATA\_B}^{-1}.$$

The calibration vectors $\vec{C}_{ZB}$, $\vec{C}_{YB}$, and $\vec{C}_{XB}$ may be calculated 1070 as the dot products of the inverted data matrix $$M_{\text{DATA\_B}}^{-1}$$

and the calculated total force $\vec{D}_{ZB}$, y-axis moment $\vec{D}_{YB}$, and the x-axis moment $\vec{D}_{XB}$, respectively.

In an exemplary embodiment of the above-described method, a touch surface of a four-sensor unit under test is oriented horizontally. A known test weight is then placed on the touch surface such that its center of gravity falls over each of four known points in succession. These points may be chosen to fall close to the corner located sensors, but inset somewhat to avoid edge interferences. For instance, they may be chosen to fall at the corners of a centered rectangle 15% smaller than the touch surface itself. The weight, or each of four identical weights, may be placed with the aid of a fixture or automatic apparatus.

Four sets of test data are collected, each comprising a vector of four differences between the sensor readings for a particular application minus those with no weight applied. Each of these data vectors is then expected, when dotted with the calibration vector for total perpendicular force, to yield the known test weight value (or some convenient scaling thereof). Equivalently, a 4×4 data matrix may be formed from the data vectors in order as rows. This is expected, when multiplied on the right by the calibration vector for total perpendicular force, to yield an expected force vector of four components all equal to the test force. Thus, the calibration vector for total perpendicular force may be extracted by multiplying the inverse of the data matrix by this expected force vector on the right.

Similarly, there is a vector of expected moments about the desired Y-axis. These moments are equal to the X-position of each test point in order times the known weight value. The calibration vector for Y-axis moment may be extracted by multiplying the inverse of the data matrix by this expected Y-axis moment vector on the right.

Similarly, there is a vector of expected moments about the desired X-axis. These moments are equal to the Y-position of each test point in order times the known weight value. The calibration vector for X-axis moment may be extracted by multiplying the inverse of the data matrix by this expected X-axis moment vector on the right.

For example, calibration forces A, B, C, and D, of 150 grams-force each, may be applied at the following points:

| | | | |
|---|---|---|---|
| Test force, upper left: | $X_A = -0.70$ | $Y_A = 0.70$ | $F_A = 150$ gm. |
| Test force, upper right: | $X_B = 0.70$ | $Y_B = 0.70$ | $F_B = 150$ gm. |
| Test force, lower left: | $X_C = -0.70$ | $Y_C = -0.70$ | $F_C = 150$ gm. |
| Test force, lower right: | $X_D = 0.70$ | $Y_D = -0.70$ | $F_D = 150$ gm. |

The changes in sensor outputs occasioned by the applications of these forces may be collected together as follows, both as measurement vectors:

$$\vec{F}_A = [f_{A1}, f_{A2}, f_{A3}, f_{A4}]$$

$$\vec{F}_B = [f_{B1}, f_{B2}, f_{B3}, f_{B4}]$$

$$\vec{F}_C = [f_{C1}, f_{C2}, f_{C3}, f_{C4}]$$

$$\vec{F}_D = [f_{D1}, f_{D2}, f_{D3}, f_{D4}] \qquad [15]$$

and as a data matrix:

$$M_{\text{DATA\_B}} = \begin{bmatrix} f_{A1} & f_{A2} & f_{A3} & f_{A4} \\ f_{B1} & f_{B2} & f_{B3} & f_{B4} \\ f_{C1} & f_{C2} & f_{C3} & f_{C4} \\ f_{D1} & f_{D2} & f_{D3} & f_{D4} \end{bmatrix} \qquad [16]$$

The vectors of expected forces and moments may be similarly collected in the same A, B, C, D order:

$$\vec{D}_{ZB} = \begin{bmatrix} 150 \\ 150 \\ 150 \\ 150 \end{bmatrix} \qquad [17]$$

$$\vec{D}_{YB} = \begin{bmatrix} -0.70 \times 150 \\ 0.70 \times 150 \\ -0.70 \times 150 \\ 0.70 \times 150 \end{bmatrix}$$

$$\vec{D}_{XB} = \begin{bmatrix} 0.70 \times 150 \\ 0.70 \times 150 \\ -0.70 \times 150 \\ -0.70 \times 150 \end{bmatrix}$$

The unknown calibration vectors must render the known data matrix into the known forces and moments in accordance with:

$$M_{DATA\_B} \cdot \vec{C}_{ZB} = \vec{D}_{ZB}$$

$$M_{DATA\_B} \cdot \vec{C}_{YB} = \vec{D}_{YB}$$

$$M_{DATA\_B} \cdot \vec{C}_{ZB} = \vec{D}_{ZB} \qquad [18]$$

Each of these three matrix equations corresponds to a system of four linear equations with four scalar unknowns. Among other methods, the unknown calibration vectors may be determined using the inverse of the known matrix $M_{DATA\_B}$:

$$\vec{C}_{ZB} = M_{\text{DATA\_B}}^{-1} \cdot \vec{D}_{ZB} \qquad [19]$$

$$\vec{C}_{YB} = M_{\text{DATA\_B}}^{-1} \cdot \vec{D}_{YB}$$

$$\vec{C}_{XB} = M_{\text{DATA\_B}}^{-1} \cdot \vec{D}_{XB}$$

This method of calibration, as so far described, provides a basic calibration with no provision for especially low susceptibility to torsional error. Indeed, with a rigid touch surface structure, variable loading of the sensors in a torsional pattern may be poorly represented in the data matrix $M_{DATA\_B}$. The susceptibility of the resulting calibration to torsional error may then be especially high. These problems may be addressed by applying the torsion response corrections as described above to the basic calibration vectors $\vec{C}_{ZB}$, $\vec{C}_{YB}$, $\vec{C}_{XB}$, or through further embodiments of the invention, such as those described below.

Figure 11:
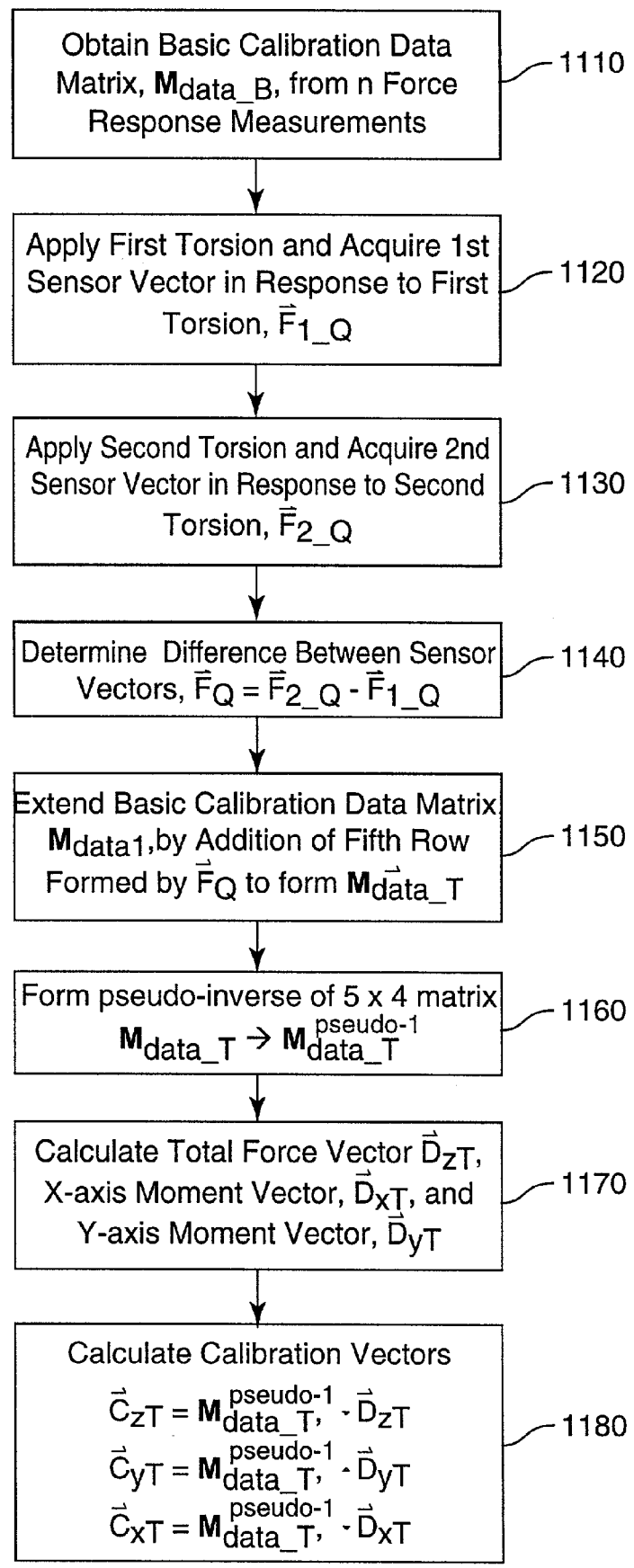
FIG. 11 is a flowchart conceptually illustrating a method for characterizing an error caused by distortion of the touch screen computed in a single step from data responsive to both known forces and deliberately applied distortions in accordance with an embodiment of the invention.

In another embodiment of the method of the invention, illustrated in the flowchart of FIG. 11, torsion corrected calibration vectors are computed from data responsive both to known touch surface forces and to deliberately applied or enhanced torsional distortion. By this method, data matrix $M_{DATA\_B}$ is acquired 1110 by the method discussed immediately above. A first distortion is applied to the touch screen and a first set of force response measurements obtained 1120. A second distortion is applied and the resulting second set of force responsive measurements obtained 1130. The differences, $f_{Q1}$, $f_{Q2}$, $f_{Q3}$, $f_{Q4}$, between the force response measurements resulting from the second applied distortion, $f_1(t_{Q2})$, $f_{Q2}(t_{Q2})$, $f_{Q3}(t_{Q2})$, $f_{Q4}(t_{Q2})$, and the first applied distortion, $f_1(t_{Q1})$, $f_{Q2}(t_{Q1})$, $f_{Q3}(t_{Q1})$, $f_{Q4}(t_{Q1})$, are calculated 1140. These values are used to extend the data matrix $M_{DATA\_B}$ by a fifth row 1150 to form a torsion extended data matrix $M_{DATA\_T}$. The pseudo-inverse of the 5×4 data matrix $M_{DATA\_T}$ is determined 1160. The total expected force vector, Y-axis moment vector, and the X-axis moment vectors are calculated from known forces and coordinates 1170. The torsion-corrected calibration vectors $\vec{C}_{ZT}$, $\vec{C}_{YT}$, $\vec{C}_{XT}$ are then calculated as the as the products of the pseudo-inverse $$M_{DATA\_T}^{PSEUDO-1}$$

of the extended data matrix $M_{DATA\_T}$ times the calculated total force $\vec{D}_{ZT}$, Y-axis moment $\vec{D}_{YT}$, and the X-axis moment $\vec{D}_{XT}$, respectively 1180.

By this method, the data matrix for basic calibration is extended by addition of a fifth row. This row may comprise the response vector to torsion (or some linear scaling of it):

$$M_{DATA\_T} = \begin{bmatrix} f_{A1} & f_{A2} & f_{A3} & f_{A4} \\ f_{B1} & f_{B2} & f_{B3} & f_{B4} \\ f_{C1} & f_{C2} & f_{C3} & f_{C4} \\ f_{D1} & f_{D2} & f_{D3} & f_{D4} \\ f_{Q1} & f_{Q2} & f_{Q3} & f_{Q4} \end{bmatrix} \quad [20]$$

This extended 5×4 matrix may be multiplied on the right by each of the calibration vectors sought:

$$M_{DATA\_T} \cdot \vec{C}_{ZT} = \vec{D}_{ZT}$$

$$M_{DATA\_T} \cdot \vec{C}_{YT} = \vec{D}_{YT}$$

$$M_{DATA\_T} \cdot \vec{C}_{ZT} = \vec{D}_{ZT} \quad [21]$$

In each case, the first four elements of the resulting 5-element vector on the right side should be the same as before, while the fifth element is expected to be zero:

$$\vec{D}_{ZT} = \begin{bmatrix} 150 \\ 150 \\ 150 \\ 150 \\ 0 \end{bmatrix} \quad [22]$$

$$\vec{D}_{YT} = \begin{bmatrix} -0.70 \times 150 \\ 0.70 \times 150 \\ -0.70 \times 150 \\ 0.70 \times 150 \\ 0 \end{bmatrix}$$

$$\vec{D}_{XT} = \begin{bmatrix} 0.70 \times 150 \\ 0.70 \times 150 \\ -0.70 \times 150 \\ -0.70 \times 150 \\ 0 \end{bmatrix}$$

While no inverse is defined for a 5×4 matrix, a suitable 4×5 pseudo-inverse may be extracted by known methods employing its singular value decomposition. That is, a matrix M of m rows by n columns, $m \geq n$, may in general be expressed as the product of three other matrices:

$$M = U \cdot W \cdot V^T \quad [23]$$

where W is an n by n diagonal matrix, and U and V are column-orthonormal matrices of sizes m by n and n by n, respectively. U, W, and V may be found by standard methods and an n by m pseudo-inverse expressed as:

$$M_{DATA\_T}^{PSEUDO-1} = V \cdot W^{-1} \cdot U^T \quad [24]$$

Calibration coefficients may then be extracted by multiplying this pseudo-inverse on the right by each of the 5-element expected-result vectors, in a manner analogous to that previously described for the conventional inverse. Note that the problem solved here is essentially one of achieving a best-fit solution to an overdetermined set of linear equations. Various methods to achieve the best-fit solution may be used. For example, solution by singular value decomposition with back-substitution may be computationally more efficient than use of an explicitly formed pseudo-inverse.

In another such embodiment, varying torsion is applied to the touch-screen support at the same time that known forces are applied to the touch surface. Calibration coefficients are then determined from the data matrix and the expected result vectors as described previously, although here there need not be any expected results that are zero, and there need not be more than four data rows. Additional rows may be added for additional known force measurements if desired, however. The overdetermination may be handled as before. It will be evident to those of ordinary skill in the art that the method of the invention may be adapted to other procedures for extracting calibration coefficients, including those that employ a larger number of touch surface forces applied at known locations, but lacking known force values.

A first class of methods have been discussed, wherein a basic calibration is prepared in one step, and refined with respect to torsion in another. This approach may offer the advantage of requiring less unit-by-unit data measurement. It may work well for a certain range of suitable devices, including those with sensors of roughly similar sensitivity that are close to a rectangular pattern. It tends to effectively minimize unwanted response to fluctuating torsion. On the other hand, there is the theoretical possibility that in the process, it may "spoil" other aspects of the calibration, in the sense of degrading accuracy in the absence of torsion. For suitable devices, however, this potential problem is not significant.

A second class of methods have also been discussed, wherein a torsion-refined calibration is prepared in a single step. This approach may offer the advantage of an optimized calibration over the full range of force-sensing touch location devices.

We now reconsider the case wherein the touch surface structure is relatively rigid, in the sense that most of the small out-of-plane movements resulting from the application of a torsional force take place in the force sensors or the supporting structure. If the touch surface itself always remains plane, its motions in response to all test forces may explore only three degrees of freedom: slight vertical motions and rotations, but no corner-to-corner saddling. Given this, calibration only from a set of known touch forces may remain an underconstrained problem, no matter how many forces and locations are used. Adding deliberate variable torsion in the support resolves this problem. Without this, however, it is noted that sensitivity to torsional interference may be particularly high. In other words, a unit with a rigid touch surface may be calibrated in the factory with a benign support lacking variable torsion. When that unit is placed in service in the field, however, it may be vulnerable to large errors from variable support torsion. A method of the invention is thus particularly beneficial in this case.

Such rigid touch surface devices may need only moderate torsional exposure during calibration to achieve satisfactory results. In another embodiment of the invention, such moderate torsional exposure may be achieved by changing the relative compliance of the support under at least one of the force sensors during the collection of calibration data. This may be accomplished in many ways. One approach involves placing materials made of differing compliance in the regions supporting the different sensors, and then rotating the overall support surface after half of the test forces have been applied.

Figure 12:
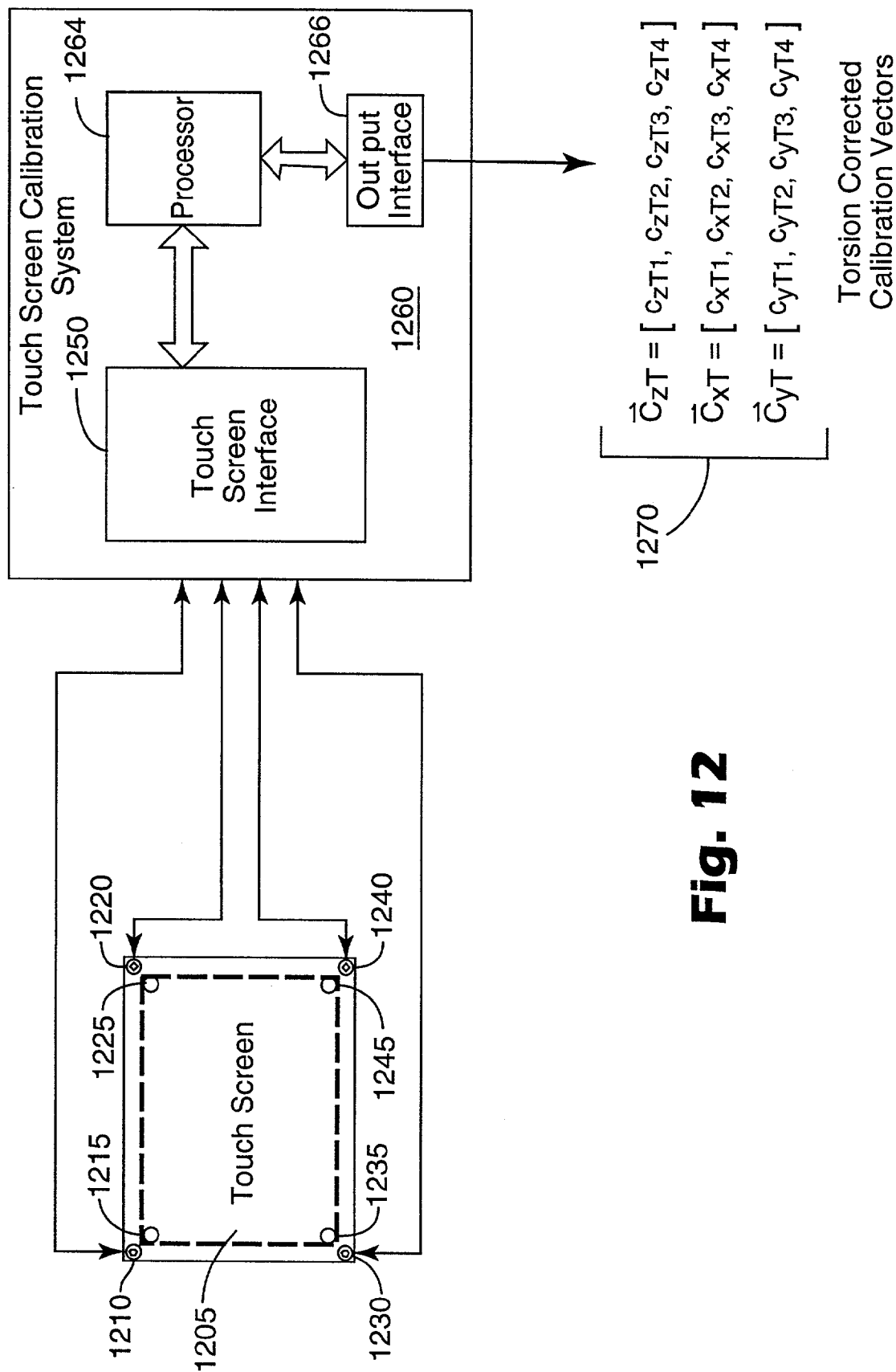
FIG. 12 is a block diagram of a touch screen calibration system in accordance with an embodiment of the invention.

A system for characterizing error in a touch screen associated with mechanical distortion is schematically illustrated in FIG. 12. In this example, a touch screen 1205 includes four touch sensors 1210, 1220, 1230, 1240 located at four corners of a rectangular touch surface. The touch screen shown is the device for which mechanical distortion error is to be characterized. Known forces may be applied to the touch screen at locations 1215, 1225, 1235, 1245 in the vicinity of the touch sensors 1210, 1220, 1230, 1240 and the force response of the sensors measured in the manner previously discussed. Additionally, one or more mechanical distortions of the touch screen may also be applied and the force response measured. The touch sensors 1210, 1220, 1230, 1240 are coupled to a touch screen interface 1250 within the touch screen calibration system 1260. The touch screen interface 1250 provides drive circuitry for energizing the sensors, as well as sense circuitry for sensing force responsive touch signals from the sensors. The touch screen interface drive/sense circuitry is similar to the sensor drive/sense circuitry 310, 320, 330, 340 schematically illustrated for the touch screen controller FIG. 3. The touch screen interface 1250 is coupled to a processor 1264 within the touch screen calibration system. The processor 1264 receives force responsive signals from the touch screen interface 1250 and controls the processes of error characterization and computation of calibration parameters. The processor 1264 may be coupled to an output interface 1266 for recording or indicating the calibration parameters 1270 determined by the touch screen calibration system 1260. The processor 1264 may also be coupled to memory circuitry 1262 for storing program code and data, including calibration parameters, for example.

It is to be appreciated that the calibration parameters 1270 may be grouped and represented in many different ways. Particular designs may apply additional transformations of touch data. For instance, known procedures of "registration" may constitute an additional level of adjustment, allowing a user-applied procedure to correct for varying alignment of the touch screen with an underlying display raster. Such a procedure may be combined with the calibration of the invention without departing from its scope, either by merging the required adjustment into the calibration parameters of the invention, or by applying them in a later stage of calculation. Various computational arrangements may be used to apply torsion corrected calibration parameters along with parameters gathered for other purposes, without departing from the scope of the invention.

Figure 13:
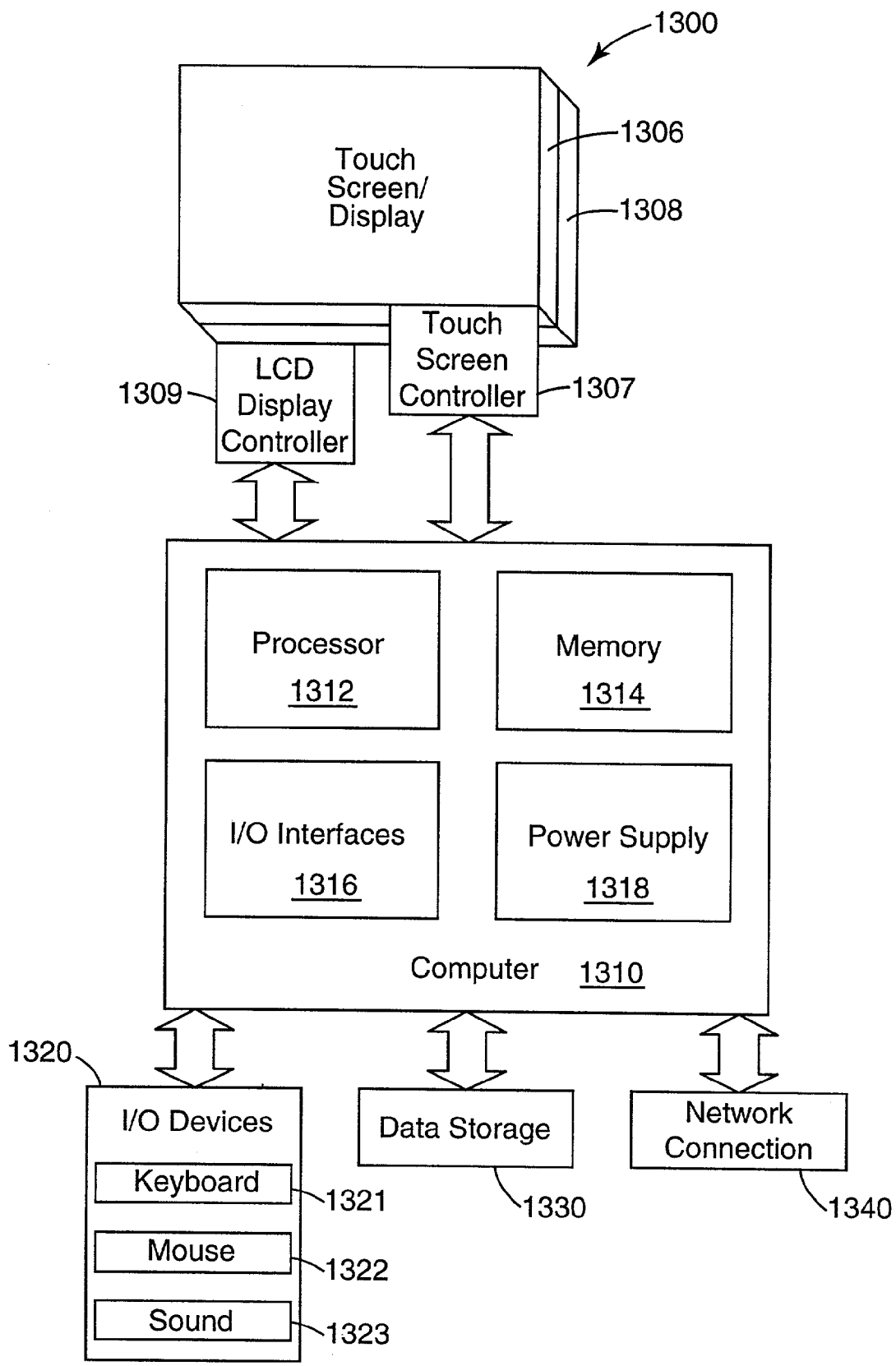
FIG. 13 is a block diagram of a data processing system using a touch sensing interface in accordance with an embodiment of the invention.

A touch screen calibrated for reduced error from mechanical distortion as described herein may be advantageously implemented in various data processing systems. Turning now to FIG. 13, a block diagram of a data processing system 1300 using an integrated touch screen and display is shown in accordance with an embodiment of the present invention. The system 1300 uses a transparent touch screen 1306 arranged above a display 1308 suitable for data processing applications, such as an LCD display. Other displays may be used, such as a CRT display, plasma display, LED display or the like. The display 1308 may require display control system circuitry 1309 for interfacing the display with the data processor computer 1310. A touch screen control system 1307 includes the drive/sense circuitry described above in addition to a touch screen control system processor according to an embodiment of the present invention.

The data processor 1310 may include various components depending upon the computer system application. For example, the data processor may include a microprocessor 1312, various types of memory circuitry 1314, a power supply 1318 and one or more input/output interfaces 1316. The input/output interfaces 1316 allow the data processing system to connect to any number of peripheral I/O devices 1320 such as keyboards 1321, pointing devices 1322, and sound devices 1323, including microphone and speakers. The data processing system may additionally include a mass data storage device 1330, for example, a hard disk drive or CD ROM drive, and may be networked to other data processing systems through a physical or wireless network connection 1340.

Figure 14:
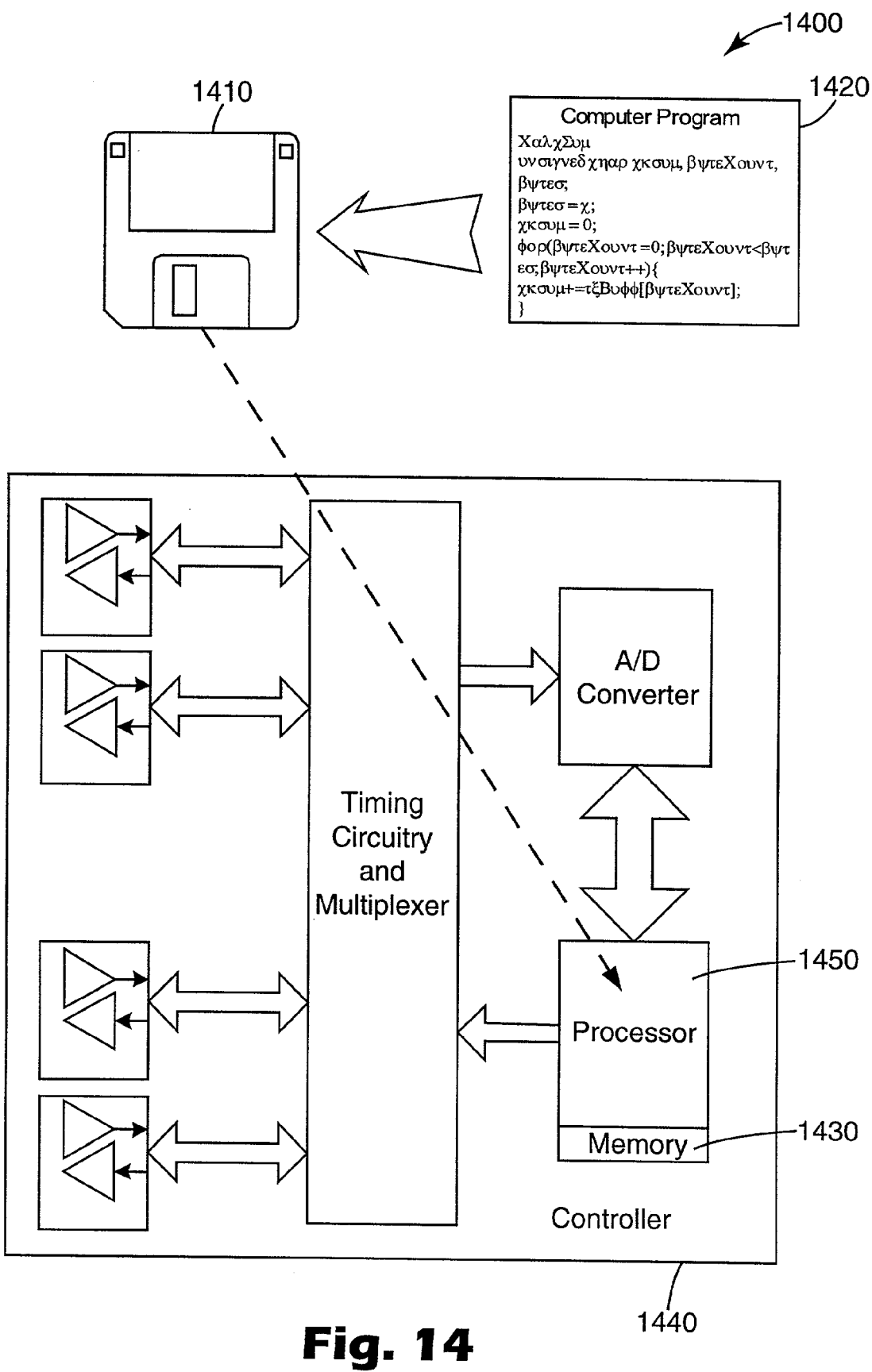
FIG. 14 illustrates a touch screen controller in accordance with an embodiment of the invention.

FIG. 14 illustrates a touch screen system 1400 in accordance with the present invention, wherein the processes of the invention described herein may be tangibly embodied in a computer-readable medium or carrier, e.g. one or more of the fixed and/or removable data storage devices 1410 illustrated in FIG. 14, or other data storage or data communications devices. One or more computer programs 1420 expressing the processes embodied on the removable data storage devices 1410 may be loaded into various memory elements 1430 located within the touch screen control system 1440 to configure the touch screen system 1400 for operation in accordance with the invention. The computer programs 1420 comprise instructions which, when read and executed by the touch screen system processor 1450 of FIG. 14, cause the touch screen system 1400 to perform the steps necessary to execute the steps or elements for detecting the location of a touch on a touch screen in accordance with the principles of the present invention.

Figure 15:
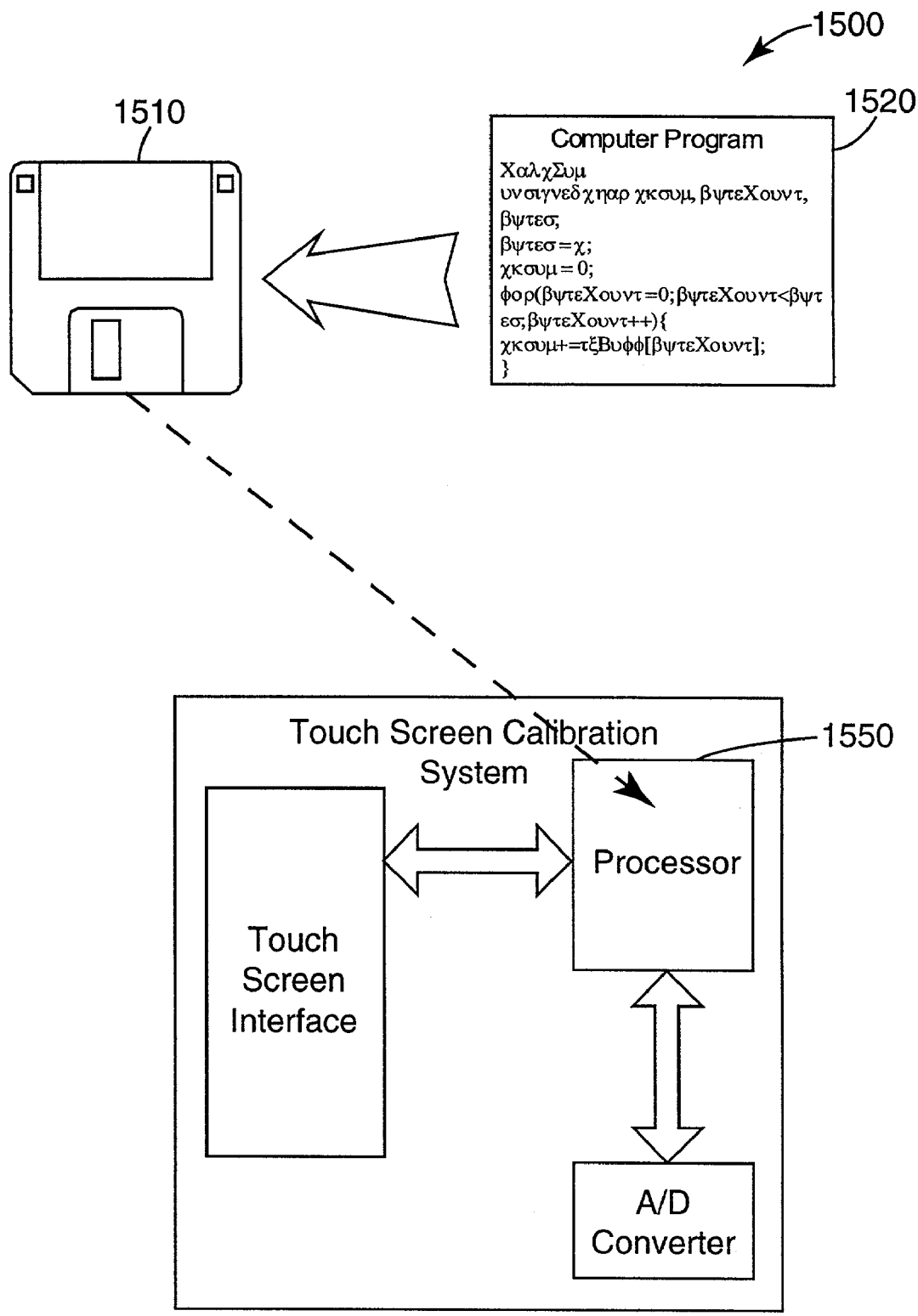
FIG. 15 illustrates a touch screen calibration system in accordance with an embodiment of the invention.

FIG. 15 illustrates a touch screen calibration system 1500 in accordance with the present invention, wherein the processes of the invention described herein may be tangibly embodied in a computer-readable medium or carrier, e.g. one or more of the fixed and/or removable data storage devices 1510 illustrated in FIG. 15, or other data storage or data communications devices. One or more computer programs 1520 expressing the processes embodied on the removable data storage devices 1510 may be loaded into various memory elements 1530 located within the touch screen calibration system 1550 to configure the touch screen calibration system 1550 for operation in accordance with the invention. The computer programs 1520 comprise instructions which, when read and executed by the touch screen calibration system 1550 of FIG. 15, cause the touch screen calibration system 1550 to perform the steps necessary to execute the steps or elements for detecting the location of a touch on a touch screen in accordance with the principles of the present invention.

A touch sensing method and system in accordance with the principles of the present invention provides for enhanced touch location accuracy in the presence of mechanical distortions of the touch screen. Other methods of improving touch location accuracy may be advantageously combined with the method of the present invention to further enhance location accuracy.

One method for timing the touch location measurement for enhanced touch location accuracy is described in U.S. patent application entitled "Method for Improving Positioned Accuracy for a Determined Touch Input," identified under Ser. No. 10/140,209 which is hereby incorporated herein by reference in its entirety. According to this method, touch location may be calculated from data gathered at a preferred time within the touch signal time profile. The method of timing the touch location may be combined with calibration methods of the present invention to further improve the accuracy of a touch location determination.

Another method for improving touch location accuracy is described in co-owned U.S. patent application entitled "Improved Baselining Techniques in Force-Based Touch Panel Systems," identified under Ser. No. 10/142,118 which is hereby incorporated herein by reference in its entirety. One or more reference levels may be identified for a touch signal. The reference levels may compensate for various conditions affecting the touch screen at the time of the touch. Touch location accuracy may be further enhanced using one or more of the identified touch signal reference levels for determining the touch location in combination with the calibration methods provided in the present invention.

Yet another method for improving touch location accuracy by correcting touch signal errors associated with viscoelastic memory effects is described in co-owned U.S. patent application entitled "Correction of Memory Effect Errors in Force-Based Touch Panel Systems," identified under Ser. No. 10/150,704 which is hereby incorporated herein by reference in its entirety. Correction of touch signal errors associated with memory effects in combination with the calibration methods of the present invention may improve the accuracy of touch location determination.

The touch sensing approach described herein is well-suited for use with various data processing systems, including personal data assistants (PDAs), electronic instruments, cell phones, and computers, including handheld, laptop and desktop computers.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and processes.

What is claimed is:

1. A method for determining a touch location on a touch screen, the touch screen incorporating a plurality of touch sensors disposed to measure a signal indicative of a touch force component that is perpendicular to a touch surface, comprising:
providing calibration parameters for the touch screen acquired using the touch sensors and the touch surface, the calibration parameters characterizing an error in an expected touch signal associated with torsion of the touch screen;
detecting a force responsive touch signal having the error; and
determining the touch location using the calibration parameters to compensate for the error in the touch signal.

2. The method of claim 1, wherein providing the calibration parameters characterizing the error associated with torsion comprises determining one or more calibration vectors characterizing the effect of torsion on an expected touch signal.

3. The method of claim 1, wherein providing the calibration parameters further comprises providing the calibration parameters determined by:
applying two or more distortion conditions to the touch screen;
detecting sensor signals corresponding to each distortion condition; and
characterizing the error in the expected touch signal using the sensor signals corresponding to each distortion condition.

4. The method of claim 3, wherein applying the two or more distortion conditions comprises:
applying a zero distortion as a first distortion condition; and
applying a non-zero distortion as a second distortion condition.

5. The method of claim 3, wherein applying the two or more distortion conditions comprises:
applying a first non-zero distortion condition as a first distortion condition; and
applying a second non-zero distortion condition as a second distortion condition.

6. The method of claim 5, wherein the first distortion condition has an effect opposite to an effect of the second distortion condition.

7. The method of claim 3, wherein characterizing the error in the expected touch signal further comprises:
determining one or more basic calibration vectors;
determining one or more distortion corrected calibration vectors using the one or more basic calibration vectors and the sensor signals corresponding to each distortion condition.

8. The method of claim 7, wherein determining one or more basic calibration vectors comprises calculating the one or more basic calibration vectors from nominal sensor locations and known parameters of the touch screen design.

9. The method of claim 7, wherein determining one or more basic calibration vectors comprises measuring sensor locations and touch screen parameters.

10. A touch screen system, comprising:
a touch surface;
a plurality of force responsive touch sensors, each of the touch sensors mechanically coupled to the touch surface and producing a sensor signal in response to a touch applied to the touch surface; and a control system, coupled to the touch sensors and receiving the sensor signals, the control system configured to provide calibration parameters for the touch screen acquired using the touch sensors and the touch surface, the calibration parameters characterizing an error in an expected touch signal associated with torsion of the touch screen, detect a force responsive touch signal having the error, and determine a touch location using the calibration parameters to compensate for the error in the touch signal.

11. The system of claim 10, wherein the plurality of touch sensors comprises capacitive force sensors.

12. The system of claim 10, wherein the touch signal is comprised of one or more combinations of sensor signals.

13. The system of claim 10, wherein the touch surface is substantially rectangular with one of the plurality of touch sensors located at each corner of the touch screen.

14. The system of claim 10, wherein the control system provides calibration parameters determined by:
applying two or more distortion conditions to the touch screen;
detecting sensor signals corresponding to each distortion condition; and
characterizing the error in the expected touch signal suing the sensor signals corresponding to each distortion condition.

15. The system of claim 10, wherein the calibration parameters provided by the control system comprise one or more distortion corrected calibration vectors.

16. A touch screen display system, comprising:
a touch screen system, including: a touch surface;
a plurality of force responsive touch sensors, each of the touch sensors mechanically coupled to the touch surface and producing a sensor signal in response to a touch applied to the touch surface; and
a control system, coupled to the touch sensors and receiving the sensor signals, the control system configured to provide calibration parameters for the touch screen acquired using the touch sensors and the touch surface, the calibration parameters characterizing an error in an expected touch signal associated with torsion of the touch screen, detect a force responsive touch signal having the error, and determine a touch location using the calibration parameters to compensate for the error in the touch signal; and
a display for displaying information through the touch screen system.

17. The system of claim 16, wherein the display is a liquid crystal display, a light emitting diode display, a plasma display or a cathode ray tube display.

18. The system of claim 16, wherein the touch sensors comprise capacitive force sensors.

19. The system of claim 16, wherein the touch surface is substantially rectangular with one of the plurality of touch sensors located at each corner of the touch screen.

20. The system of claim 16, wherein the control system provides calibration parameters determined by:
applying two or more distortion conditions to the touch screen;
detecting sensor signals corresponding to each distortion condition; and
characterizing the error in the expected touch signal suing the sensor signals corresponding to each distortion condition.

21. The system of claim 16, wherein the calibration parameters provided by the control system comprise one or more distortion corrected calibration vectors.

22. A display system, comprising:
a touch screen system, including
a touch surface;
a plurality of touch sensors, each of the touch sensors mechanically coupled to the touch surface and producing a sensor signal in response to a touch applied to the touch surface; and
a control system, coupled to the touch sensors and receiving the sensor signals, the control system configured to provide calibration parameters for the touch screen acquired using the touch sensors and the touch surface, the calibration parameters characterizing an error in an expected touch signal associated with torsion of the touch screen, detect a force responsive touch signal having the error, and determine a touch location using the calibration parameters to compensate for the error in the touch signal;
a display for displaying information; and
a processor coupled to the display and the touch screen system for processing data to be displayed on the display and information received from the touch screen system.

23. The system of claim 22, wherein the display displays information through the touch screen.

24. The system of claim 22, wherein the display is a liquid crystal display, a light emitting diode display, a plasma display or a cathode ray tube display.

25. The system of claim 22, wherein the processor receives information regarding a touch made on the touch screen relative to information displayed on the display.

26. The system of claim 22, wherein the touch sensors comprise capacitive force sensors.

27. The system of claim 22, further comprising:
one or more data storage devices coupled to the processor for storing data; one or more input devices for transferring information to the processor; and
one or more output devices for transferring information from the processor.

28. The system of claim 22, further comprising one or more interfaces for coupling the system to one or more networks.

29. The system of claim 22, wherein the touch signal is comprised of one or more combination s of sensor signals.

30. The system of claim 22, wherein the touch surface is substantially rectangular with one of the plurality of touch sensors located at each corner of the touch screen.

31. The system of claim 22, wherein the control system provides calibration parameters determined by:
applying two or more distortion conditions to the touch screen;
detecting sensor signals corresponding to each distortion condition; and
characterizing the error in the expected touch signal using the sensor signals corresponding to each distortion condition.

32. The system of claim 22, wherein the calibration parameters provided by the control system comprise one or more distortion corrected calibration vectors.

33. A system for determining touch location on a touch screen, the touch screen defined by a plurality of touch sensors mechanically coupled to a touch surface, comprising:
means for providing touch screen calibration parameters acquired using the touch surface and the touch sensors, the touch screen calibration parameters characterizing touch signal error associated with a mechanical distortion of the touch screen;

means for detecting a touch signal having the touch signal error;
means for correcting the touch signal using the touch screen calibration; and
means for determining the touch location using the corrected touch signal;
wherein means for providing the touch screen calibration parameters comprises means for providing a characterization of an effect of torsion on the touch screen.

34. The system of claim 33, wherein means for providing the touch screen calibration parameters comprises means for providing one or more distortion corrected calibration vectors.

35. The system of claim 33, wherein means for providing the touch screen calibration parameters comprises means for providing one or more torsion corrected calibration vectors.

36. A computer-readable medium configured with executable instructions for causing one or more computers to perform a method for determining a touch location on a touch screen, the touch screen defined by a plurality of touch sensors disposed to measure a signal indicative of a touch force component that is perpendicular to the touch screen, comprising:
providing calibration parameters for the touch screen acquired using the touch sensors and the touch surface, the calibration parameters characterizing an error in an expected touch signal associated with torsion of the touch screen;
detecting a force responsive touch signal having the error; and
determining the touch location using the calibration parameters to compensate for the error in the touch signal.

37. A method for determining a touch location on a touch screen, the touch screen incorporating a plurality of touch sensors disposed to measure a signal indicative of a touch force component that is perpendicular to a touch surface, comprising:
providing calibration parameters for the touch screen acquired using the touch sensors and the touch surface, the calibration parameters characterizing an error in an expected touch signal associated with mechanical distortion of the touch screen, the calibration parameters determined by:
applying two or more distortion conditions to the touch screen;
detecting sensor signals corresponding to each distortion condition; and
characterizing the error in the expected touch signal using the sensor signals corresponding to each distortion condition;
detecting a force responsive touch signal having the error; and
determining the touch location using the calibration parameters to compensate for the error in the touch signal.

38. The method of claim 37, wherein applying the two or more distortion conditions comprises:
applying a zero distortion as a first distortion condition; and
applying a non-zero distortion as a second distortion condition.

39. The method of claim 37, wherein applying the two or more distortion conditions comprises:
applying a first non-zero distortion condition as a first distortion condition; and
applying a second non-zero distortion condition as a second distortion condition.

40. The method of claim 39, wherein the first distortion condition has an effect opposite to an effect of the second distortion condition.

41. The method of claim 37, wherein characterizing the error in the expected touch signal further comprises:
determining one or more basic calibration vectors;
determining one or more distortion corrected calibration vectors using the one or more basic calibration vectors and the sensor signals corresponding to each distortion condition.

42. The method of claim 41, wherein determining one or more basic calibration vectors comprises calculating the one or more basic calibration vectors from nominal sensor locations and known parameters of the touch screen design.

43. The method of claim 41, wherein determining one or more basic calibration vectors comprises measuring sensor locations and touch screen parameters.

44. A touch screen system, comprising:
a touch surface;
a plurality of force responsive touch sensors, each of the touch sensors mechanically coupled to the touch surface and producing a sensor signal in response to a touch applied to the touch surface; and
a control system, coupled to the touch sensors and receiving the sensor signals, the control system configured to provide calibration parameters for the touch screen acquired using the touch sensors and the touch surface, the calibration parameters characterizing an error in an expected touch signal associated with mechanical distortion of the touch screen, detect a force responsive touch signal having the error, and determine a touch location using the calibration parameters to compensate for the error in the touch signal, the calibration parameters determined by:
applying two or more distortion conditions to the touch screen;
detecting sensor signals corresponding to each distortion condition; and
characterizing the error in the expected touch signal suing the sensor signals corresponding to each distortion condition.

45. A touch screen system, comprising:
a touch surface;
a plurality of force responsive touch sensors, each of the touch sensors mechanically coupled to the touch surface and producing a sensor signal in response to a touch applied to the touch surface; and
a control system, coupled to the touch sensors and receiving the sensor signals, the control system configured to provide calibration parameters for the touch screen acquired using the touch sensors and the touch surface, the calibration parameters characterizing an error in an expected touch signal associated with mechanical distortion of the touch screen, detect a force responsive touch signal having the error, and determine a touch location using the calibration parameters to compensate for the error in the touch signal, the calibration parameters comprising one or more distortion corrected calibration vectors.

46. A touch screen display system, comprising:
a touch screen system, including: a touch surface;
a plurality of force responsive touch sensors, each of the touch sensors mechanically coupled to the touch surface and producing a sensor signal in response to a touch applied to the touch surface; and a control system, coupled to the touch sensors and receiving the sensor signals, the control system configured to provide calibration parameters for the touch screen acquired using the touch sensors and the touch surface, the calibration parameters characterizing an error in an expected touch signal associated with mechanical distortion of the touch screen, detect a force responsive touch signal having the error, and determine a touch location using the calibration parameters to compensate for the error in the touch signal, the calibration parameters determined by:
  applying two or more distortion conditions to the touch screen;
  detecting sensor signals corresponding to each distortion condition; and
  characterizing the error in the expected touch signal suing the sensor signals corresponding to each distortion condition; and
a display for displaying information through the touch screen system.

47. A display system, comprising:
a touch screen system, including
  a touch surface;
  a plurality of touch sensors, each of the touch sensors mechanically coupled to the touch surface and producing a sensor signal in response to a touch applied to the touch surface; and
  a control system, coupled to the touch sensors and receiving the sensor signals, the control system configured to provide calibration parameters for the touch screen acquired using the touch sensors and the touch surface, the calibration parameters characterizing an error in an expected touch signal associated with mechanical distortion of the touch screen, detect a force responsive touch signal having the error, and determine a touch location using the calibration parameters to compensate for the error in the touch signal, the calibration parameters determined by:
  applying two or more distortion conditions to the touch screen;
  detecting sensor signals corresponding to each distortion condition; and
  characterizing the error in the expected touch signal using the sensor signals corresponding to each distortion condition;
a display for displaying information; and
a processor coupled to the display and the touch screen system for processing data to be displayed on the display and information received from the touch screen system.

48. A system for determining touch location on a touch screen, the touch screen defined by a plurality of touch sensors mechanically coupled to a touch surface, comprising:
  means for providing touch screen calibration parameters acquired using the touch surface and the touch sensors, the touch screen calibration parameters characterizing touch signal error associated with a mechanical distortion of the touch screen;
  means for detecting a touch signal having the touch signal error;
  means for correcting the touch signal using the touch screen calibration; and
  means for determining the touch location using the corrected touch signal;
  wherein means for providing the touch screen calibration parameters comprises means for providing one or more torsion corrected calibration vectors.

49. A computer-readable medium configured with executable instructions for causing one or more computers to perform a method for determining a touch location on a touch screen, the touch screen defined by a plurality of touch sensors disposed to measure a signal indicative of a touch force component that is perpendicular to the touch screen, comprising:
  providing calibration parameters for the touch screen acquired using the touch sensors and the touch surface, the calibration parameters characterizing an error in an expected touch signal associated with mechanical distortion of the touch screen, the calibration parameters determined by:
    applying two or more distortion conditions to the touch screen;
    detecting sensor signals corresponding to each distortion condition; and
    characterizing the error in the expected touch signal using the sensor signals corresponding to each distortion condition;
  detecting a force responsive touch signal having the error; and
  determining the touch location using the calibration parameters to compensate for the error in the touch signal.

* * * * *